United States Patent
Aron et al.

(10) Patent No.: US 9,720,947 B2
(45) Date of Patent: Aug. 1, 2017

(54) BACKUP OPERATIONS IN A TREE-BASED DISTRIBUTED FILE SYSTEM

(71) Applicant: Cohesity, Inc., Santa Clara, CA (US)

(72) Inventors: Mohit Aron, Los Altos, CA (US); Ganesha Shanmuganathan, Santa Clara, CA (US)

(73) Assignee: Cohesity, Inc., Santa Clara, CA (US)

( * ) Notice: Subject to any disclaimer, the term of this patent is extended or adjusted under 35 U.S.C. 154(b) by 360 days.

(21) Appl. No.: 14/450,730

(22) Filed: Aug. 4, 2014

(65) Prior Publication Data
US 2016/0034356 A1    Feb. 4, 2016

(51) Int. Cl.
G06F 17/30    (2006.01)
G06F 11/14    (2006.01)

(52) U.S. Cl.
CPC .... G06F 17/30327 (2013.01); G06F 11/1435 (2013.01); *G06F 2201/84* (2013.01)

(58) Field of Classification Search
CPC .............................................. G06F 17/30194
See application file for complete search history.

(56) References Cited

U.S. PATENT DOCUMENTS

| | | | |
|---|---|---|---|
| 7,917,474 B2 | 3/2011 | Passey et al. | |
| 9,009,106 B1 | 4/2015 | Aron et al. | |
| 2003/0158861 A1* | 8/2003 | Sawdon | G06F 11/1435 |
| 2007/0106632 A1 | 5/2007 | Bonwick et al. | |
| 2008/0270592 A1 | 10/2008 | Choudhary et al. | |
| 2010/0115011 A1 | 5/2010 | Callahan et al. | |
| 2010/0174690 A1* | 7/2010 | Marcotte | G06F 17/30174 707/695 |
| 2010/0198849 A1 | 8/2010 | Thomas et al. | |
| 2011/0289071 A1 | 11/2011 | Gangadhar | |
| 2013/0110786 A1 | 5/2013 | Wu | |
| 2013/0339406 A1 | 12/2013 | Kanfi | |
| 2014/0040199 A1* | 2/2014 | Golab | G06F 17/30309 707/634 |
| 2014/0074841 A1 | 3/2014 | Majnemer et al. | |
| 2014/0156618 A1 | 6/2014 | Castellano | |
| 2015/0112939 A1 | 4/2015 | Cantwell et al. | |

OTHER PUBLICATIONS

International Search Report and Written Opinion dated Oct. 28, 2015 for International Application No. PCT/US2015/043623.
International Search Report and Written Opinion dated Oct. 26, 2015 for International Application No. PCT/US2015/043636.

* cited by examiner

*Primary Examiner* — William Spieler
(74) *Attorney, Agent, or Firm* — Van Pelt, Yi & James LLP

(57) ABSTRACT

Techniques for cloning, writing to, and reading from file system metadata. Cloning involves identifying a first set of pointers included in a first root node in a file system metadata tree structure that stores file system metadata in leaf nodes of the tree structure, creating a first copy of the first root node that includes the first set of pointers, creating a second copy of the first root node that includes the first set of pointers, associating the first copy with a first view, and associating the second copy with a second view. Reading generally involves traversing the tree structure towards a target leaf node that contains data to be read. Writing generally involves traversing the tree structure in the same manner, but also creating copies of any nodes to be modified if those nodes are deemed to have a different treeID than a particular root node.

16 Claims, 16 Drawing Sheets

BACKUP OPERATIONS IN A TREE-BASED DISTRIBUTED FILE SYSTEM

BACKGROUND OF THE INVENTION

Field of the Invention

Embodiments presented herein generally relate to distributed storage and, more specifically, to backup operations in a tree-based distributed file system.

Description of the Related Art

Managing a file system generally requires managing a large amount of metadata about objects in the file system. Such metadata includes information such as file sizes, directory structures, file permissions, physical storage locations of the files, and the like. In order to back-up file system information, it desirable to frequently and quickly "clone" or "snapshot" the metadata stored for a given file system. However, due to the manner in which that metadata information is typically stored, it is often difficult to frequently and quickly clone the metadata for a file system.

Frequently, such metadata is stored in a "flat" data store such as a NoSQL store (NoSQL stands for "Not Only Structured Query Language"). In such a "flat" store, each item in the store can be accessed directly from a starting object (e.g., a root node). Quickly cloning the metadata stored in a flat store is difficult because each item in the store needs to be copied. Because the number of metadata entries can grow to be high (e.g., millions of entries), copying the metadata becomes very time-consuming, which prevents the file system from being quickly copied.

One could avoid copying each node in a flat store by simply creating a root node copy that includes a reference to the original root node. Modifications to the metadata would then be made by creating new entries corresponding to those modifications, and updating the pointers from the root node copy to point to the new entries.

One issue with doing this, however, is that after many such cloning operations, the access time to nodes in the original flat store become very high, since this approach generates long chains of root nodes. Eventually, in order to reduce the access times, a coalescing operation can be performed, where each item in the original data store is copied each root node, so that each root node has a full set of metadata entries. However, because the number of metadata entries can be quite high, as described above, such coalescing operations result in at least some of the cloning operations requiring a large amount of time to complete.

SUMMARY OF THE INVENTION

One embodiment includes a method for creating a backup copy of a set of file system metadata. The method includes identifying a first set of pointers included in a first root node in a file system metadata tree structure that stores file system metadata in leaf nodes of the tree structure. The method also includes creating a first copy of the first root node that includes the first set of pointers, creating a second copy of the first root node that includes the first set of pointers, associating the first copy with a first view, and associating the second copy with a second view.

Another embodiment includes a system having a processor and a memory. The memory stores a metadata management application, which, when executed on the processor, performs an operation. The operation itself includes identifying a first set of pointers included in a first root node in a file system metadata tree structure that stores file system metadata in leaf nodes of the tree structure. The operation also includes creating a first copy of the first root node that includes the first set of pointers, creating a second copy of the first root node that includes the first set of pointers, associating the first copy with a first view, and associating the second copy with a second view.

Another embodiment includes a computer-readable medium storing one or more applications which, when executed by a processor perform an operation. The operation itself includes identifying a first set of pointers included in a first root node in a file system metadata tree structure that stores file system metadata in leaf nodes of the tree structure. The steps also includes creating a first copy of the first root node that includes the first set of pointers, creating a second copy of the first root node that includes the first set of pointers, associating the first copy with a first view, and associating the second copy with a second view.

DETAILED DESCRIPTION OF THE PREFERRED EMBODIMENTS

Embodiments disclosed herein provide techniques for efficiently managing metadata in a distributed file system. The techniques generally maintain a file system metadata tree structure that stores the file system metadata. In one embodiment, the tree structure includes a root node and leaf nodes, as well as intermediate nodes (for all but the smallest size trees). The leaf nodes store file system metadata values for access. This tree structure allows the file system metadata to be cloned by simply copying the root node and each pointer stored by the root node to the next level of the tree structure. Because the number of pointers for a root node is limited to a relatively small number, copying the root node does not require a large amount of time. Thus, clones of the file system metadata can be made quickly and frequently. Additionally, modifying the tree structure involves a maximum of log (N) write operations, where N is the number of leaf nodes in the tree. This number represents a manageable number of write operations, even when N is very large. Embodiments disclosed herein also provide techniques for reading and writing values to the metadata tree in a synchronized manner with the use of a distributed lock system, as well as techniques for caching data in the metadata tree structure.

Figure 1:
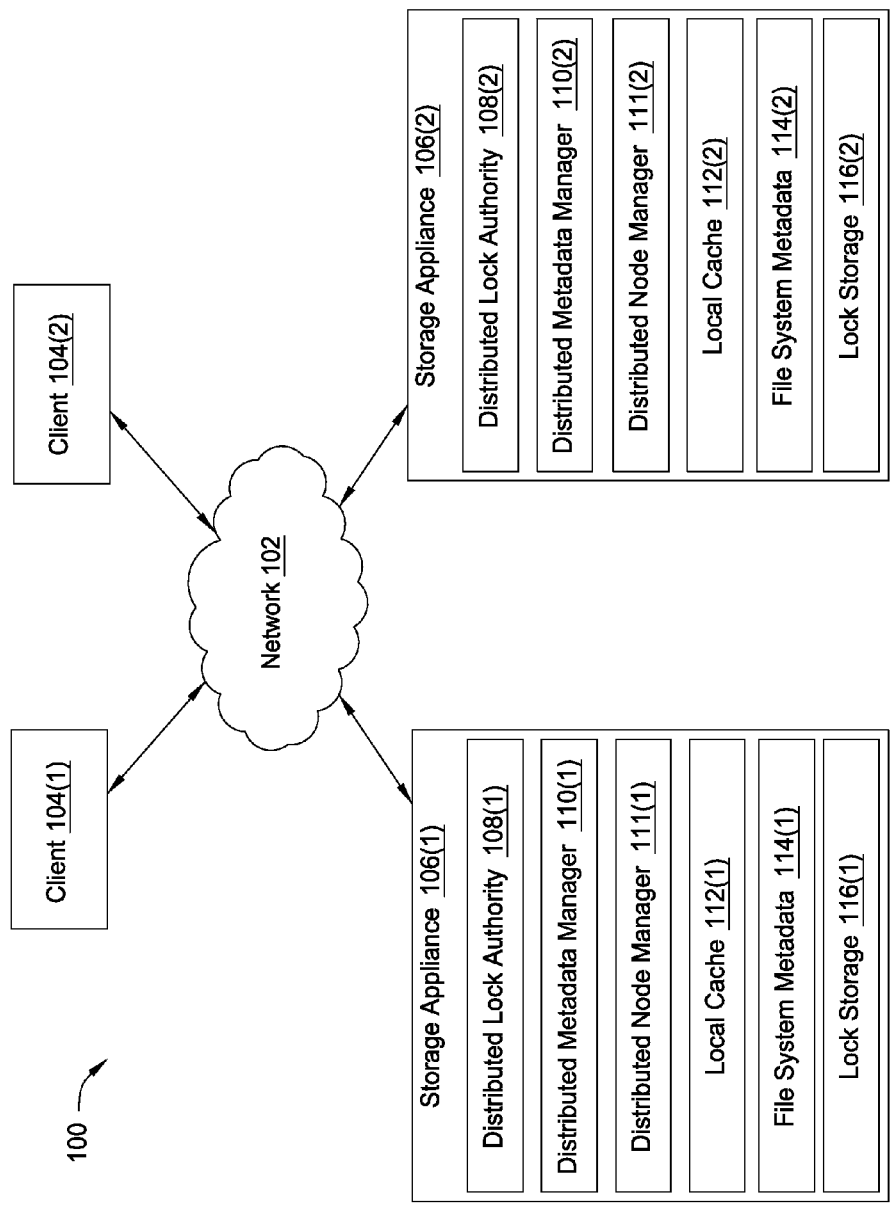
FIG. 1 illustrates a distributed storage system, according to one embodiment.

FIG. 1 illustrates a distributed storage system 100, according to one embodiment of the present invention. As shown, the distributed storage system 100 includes storage appliances 106, which are coupled to a network 102. Client systems 104 are also coupled to the network 102.

The network 102 is a computer network such as a local network or a global computer network like the Internet. Storage appliances 106 are computer systems such as servers, that include processors, memory storing applications and data, and other computer components. As shown, storage appliances 106 each include a distributed lock authority 108, a distributed metadata manager 110, and a distributed node manager 111. As described in detail below, the distributed metadata manager 110 and distributed node manager 111 operate together to manage stored file system metadata 114. Each storage appliance 106 includes a local cache 112 of nodes accessed by distributed metadata manager 110. Distributed lock authority 108 stores and updates locks stored in lock storage 116.

In one embodiment, the distributed metadata manager 110 maintains file system metadata in the form of nodes arranged in a tree (a "file system metadata tree structure"). Leaf nodes in the file system metadata tree structure include key-value pairs that associate metadata keys with values in the form of particular items of file system metadata. The file system metadata is the metadata for a distributed file system and includes information such as file sizes, directory structures, file permissions, physical storage locations of the files, and the like. A requestor requests a particular item of metadata by providing a metadata key to a distributed metadata manager 110, which traverses a file system metadata tree to find the item of metadata associated with that metadata key.

Embodiments are described herein using a tree storing file system metadata as a reference of example metadata stored in a tree. As another example, the tree may be used to store metadata related to a single file. In such a case, leaf nodes of the tree store details about blocks of data within the individual file.

Of course, one of skill in the art will recognize that the tree structure disclosed herein may be adapted for use in a broad variety of situations and with a broad variety of data types.

The distributed node manager 111 updates the nodes of the file system metadata tree structure in a distributed manner. More specifically, nodes in a file system metadata tree structure each have an associated node identifier (ID). The node ID acts as a node key for lookups performed by the distributed node manager 111. The nodes are stored in a distributed manner in that each node is stored on one or more storage appliances 106. Thus, when a distributed metadata manager 110 on a particular storage appliance 106 requests a node via the corresponding node key, that node may be stored in file system metadata 114 on that particular storage appliance 106 or within file system metadata 114 on a different storage appliance 106. In some embodiments, distributed node manager 111 stores the nodes in a distributed NoSQL store.

Note, the distributed metadata manager 110 and the distributed node manager 111 operate at two different logical "levels" of information. The first level is the level of the individual nodes, where distributed node manager 111 provides a node in response to a node key. This first level has no notion of a tree structure, and only "blindly" reads and writes nodes upon request, based on the node key. The second level is the level of the tree, where distributed metadata manager 110 accesses nodes maintained by the distributed node manager 111 as a tree structure to provide file system metadata in response to metadata keys. Maintaining the file system metadata in a tree structure allows file system data to be managed efficiently, as is described in more detail below. Maintaining the individual nodes as a distributed NoSQL store allows the storage appliances 106 to maintain the file system metadata in a distributed manner.

The distributed lock authority 108 provides synchronization locks to nodes in the tree. The distributed lock authority 108 provides for at least two types of locks: a read-lock and a write-lock. A requesting entity, such as a storage appliance 106, that holds a read-lock on a particular node is allowed to read the contents of that node but is not allowed to modify that node. A requesting entity that holds a write-lock on a particular node is allowed to both read and modify the contents of that node. Only one storage appliance 106 may obtain a write-lock on any particular node. Thus, write-locks may also be thought of as exclusive locks. More than one storage appliances 106 may hold a read-lock on any particular node. Thus, read-locks may also be thought of as non-exclusive or shared locks. Distributed lock authority 108 stores locks in lock storage 116.

Client system 104 is a computer system that includes processors, memory storing applications and data, and other hardware and software components. Client systems 104 may request file system metadata from storage appliances 106, via metadata keys. Although only two storage appliances 106 and two clients 104 are shown, distributed storage system 100 may include any number of storage appliances 106 and any number of clients 104.

Figure 2:
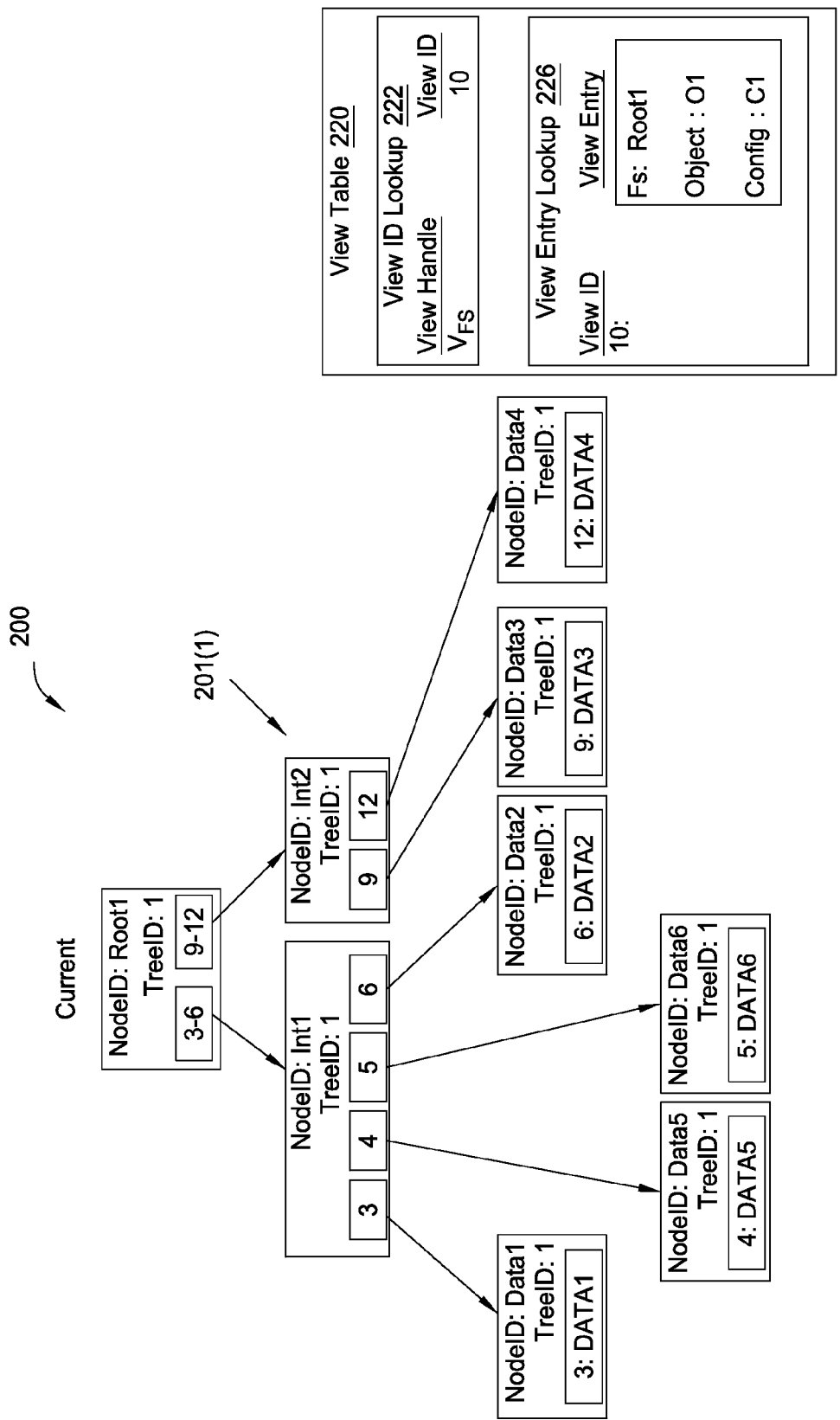
FIG. 2 illustrates example file system metadata, according to one embodiment.

FIG. 2 illustrates example file system metadata 200, according to one embodiment. File system metadata 200 is stored in file system metadata storage 114 in one or more storage appliances 106. As shown, the file system metadata 200 includes a file system metadata tree 201(1) and a view table 220. The file system metadata tree 201(1) includes nodes. Each node includes a node identifier (ID) and a tree identifier (ID). Further, as shown, a tree may have three types of nodes: root nodes, such as the node with node ID Root1, intermediate nodes, such the node with node ID Int1, and leaf nodes, such as the node with node ID Data1. Root nodes and intermediate nodes include pointers to other nodes. For example, node Rood includes a pointer to node Int1 and a pointer to node Int2. A leaf node is a terminal branch of the tree, i.e., a leaf node does not include pointers to other nodes.

The node IDs act as the node keys for distributed node manager 111 to perform a lookup operation. The distributed metadata manager 110 can access the contents of a node by providing a node key (node ID) to the distributed node manager 111. Note, the node IDs depicted in FIG. 2 are represented as alphanumerical node ID's for clarity. However, node IDs may be in different forms, such as purely numerical, purely alphabetical, or other representation.

Root nodes, as the name implies, are at the root of a file system metadata tree 201 and include pointers to other nodes. No node points to a root node. Intermediate nodes are nodes pointed to by at least one other node and include a pointer to at least one other node. Leaf nodes are nodes at the bottom of the tree. Leaf nodes are pointed to by at least one other node but that do not point to any other node. In one embodiment, e.g., one storing metadata for a file system, leaf nodes store key-value pairs of file system metadata. Metadata keys are lookup values by which a particular leaf node may be accessed, from distributed metadata manager 110. Values are the actual file system metadata, such as, for example, file size, physical storage location for file data, access permissions, and other information.

Each root node and each intermediate node stores pointers to other nodes in the file system metadata tree 201. The pointers are depicted in FIG. 2 with arrows. Each pointer includes a range of numerical and sorted metadata keys that can be found by following that particular pointer.

In the example file system metadata tree 201(1) illustrated in FIG. 2, the Root1 node includes a pointer to an Int1 node and a pointer to an Int2 node. The pointer to the Int1 node indicates a range of keys, specifically, metadata keys 3 through 6 can be found by following that pointer. The pointer to the Int2 node indicates that metadata keys 9 through 12 can be found by following that pointer. The Int1 and Int2 nodes also include pointers which indicate the metadata keys that can be found by following those pointers. As shown, the leaf nodes of tree 201(1) each include a metadata-key-value pair. Note, as a result, the pointer to each leaf node includes only the key of that leaf node.

Also note, each node has a corresponding "degree," equal to the number of pointers from that particular node to other nodes. Stated differently, the degree of a given node equals the number of direct children of that node. A first node is a direct child of a second node if the second node has a pointer to the first node. In one embodiment, the degree of an intermediate node is prevented from dropping below a minimum threshold (also referred to herein as "$t_{min}$") and from exceeding a maximum threshold (also referred to herein as "$t_{max}$"). In some embodiments, $t_{max}$ is a multiple of $t_{min}$. For example, in some embodiments, $t_{max}=3t_{min}$ or $t_{max}=2t_{min}$. The degree for a root node cannot exceed $t_{max}$, although there is no minimum degree for the root node. In other words, a root node can have a number of direct children that is greater than or equal to zero and less than or equal to $t_{max}$.

Distributed metadata manager 110 may add or delete nodes as more file system metadata is stored. If adding a node would cause the degree of a node to exceed $t_{max}$ for that node, then the distributed metadata manager 110 adds additional nodes to support the new node, as discussed in greater detail below with reference to FIG. 4A. Similarly, if removing a node would cause the degree of a node to drop below $t_{min}$ for that node, then the distributed metadata manager 110 removes nodes, as discussed in greater detail below with reference to FIGS. 4B.

A file system metadata tree 201 may store file system data for one or more views. Views are logical "perspectives" of a file system relative to a particular point in time. In one example, a "current" view may represent a perspective of the file system that is up-to-date, and another view may represent a perspective of the file system that is 10 minutes old. Any particular file system metadata tree 201 may include information for a large number of different views.

In one embodiment, the file system metadata 200 includes a view table 220 used to manage views. The view table 220 stores data for accessing different views. For example, the view table 220 may includes a view identifier (ID) lookup 222 and a view entry lookup 226. The view ID lookup 222 associates view handles with view IDs. The view entry lookup 226 associates view IDs with view entries. View entries include root nodes for three different view components: file metadata (labeled "fs"), object data (labeled "object"), and configuration data (labeled "config"). File metadata stores information such as file sizes, pointers to physical storage for the file, and the like. "Object" stores information to access file system data as objects instead of conventional files. Each object typically includes the data itself, a variable amount of metadata, and other details. "Config" stores configuration information for the file system. Storage appliance 106 may access file system metadata, object data, or configuration data for a particular view by first retrieving the view ID from the view ID lookup 222 with the view handle, and then accessing the desired root node from the view entry lookup 226. Subsequently, the storage appliance 106 accesses that root node and traverses through the tree to access the particular leaf node, following pointers associated with the desired metadata key. Then, the storage appliance 106 reads the data in the leaf node to obtain the requested file system metadata.

TreeIDs identify nodes as being associated with a particular view. As described in more detail below, distributed metadata manager 110 reads tree IDs to perform certain operations, such as modifying nodes, adding nodes, or deleting nodes. In FIG. 2, only a single tree ID is depicted. However, a file system metadata tree 201 may include nodes that have different tree IDs.

Figure 3A:
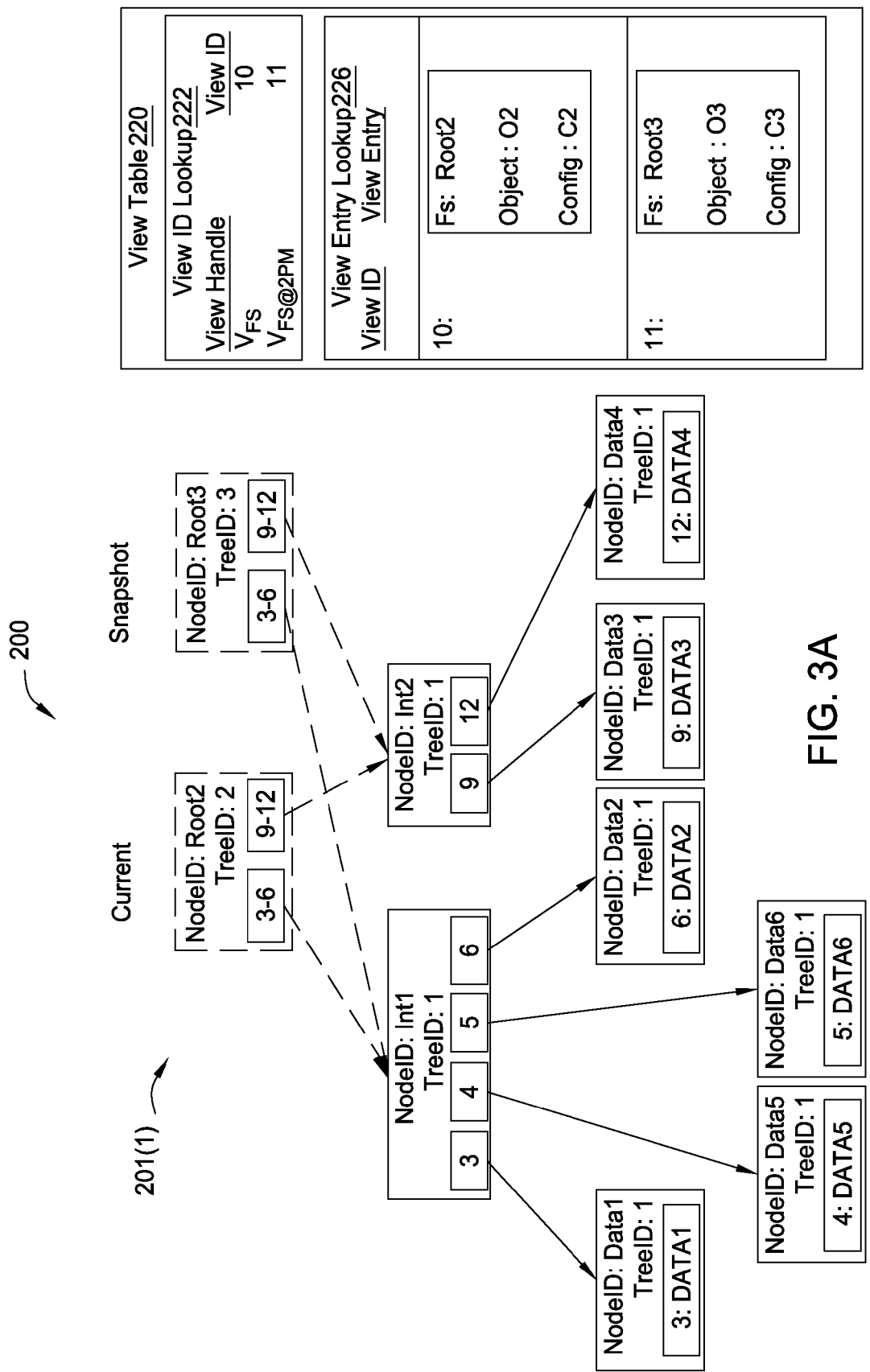
FIG. 3A illustrates the file system metadata tree of FIG. 2 after distributed storage system has taken a snapshot of the "current" view, according to one embodiment.

FIG. 3A illustrates the file system metadata tree 201(1) of FIG. 2 after distributed storage system 100 creates a snapshot of a "current" view. Creating a snapshot of a particular view effectively creates a clone of that view. To create a snapshot of the current view, the distributed metadata manager 110 creates two copies of the root node associated with each view component of the current view. Each copy of the root node includes the pointers of the original root node. Further, each copy is given a new treeID. In some embodiments, the distributed metadata manager 110 deletes the original root node. The distributed metadata manager 110 also updates the view table 220 so that the view handle associated with the current view points to one of the root node copies and the view handle associated with the view for the snapshot points to the other root node copy. Providing two new root nodes, each with a different tree ID prevents updates made to a particular view (e.g., the current view) from affecting nodes of a different view (e.g., the snapshot view). As shown in FIG. 3A, the snapshot may be associated with a particular time (2 PM), indicating that the snapshot is a snapshot of the file system metadata taken at that particular time.

In the example file system metadata tree 201(1) in FIG. 3A, Root2 is associated with the current view, $V_{FS}$. To create the snapshot of the file system data view component, having corresponding root node of Root1, distributed metadata manager 110 creates two copies of Root1, each with a different tree ID. Each of the copies of the root node (Root2 and Root3) includes pointers that point to the nodes that the original root node pointed. Also, Root2 includes a treeID of 2 and Root3 includes a treeID of 3. Additionally, distributed metadata manager 110 modifies view table 220 so that the current view—$V_{FS}$—is associated with Root2, and the snapshot view—$V_{FS@\ 2\ PM}$—is associated with Root3. Distributed metadata manager 110 deletes Root1 because it is no longer needed. For simplicity, in FIG. 3A only the file system metadata view component of each view is shown represented in the tree 201(1) (i.e., there is no data associated with the object view component or the configuration component). However, to completely clone a view, the distributed metadata manager 110 would create two copies of the root node for the file system view component, the object view component, and the configuration view component.

Figure 3B:
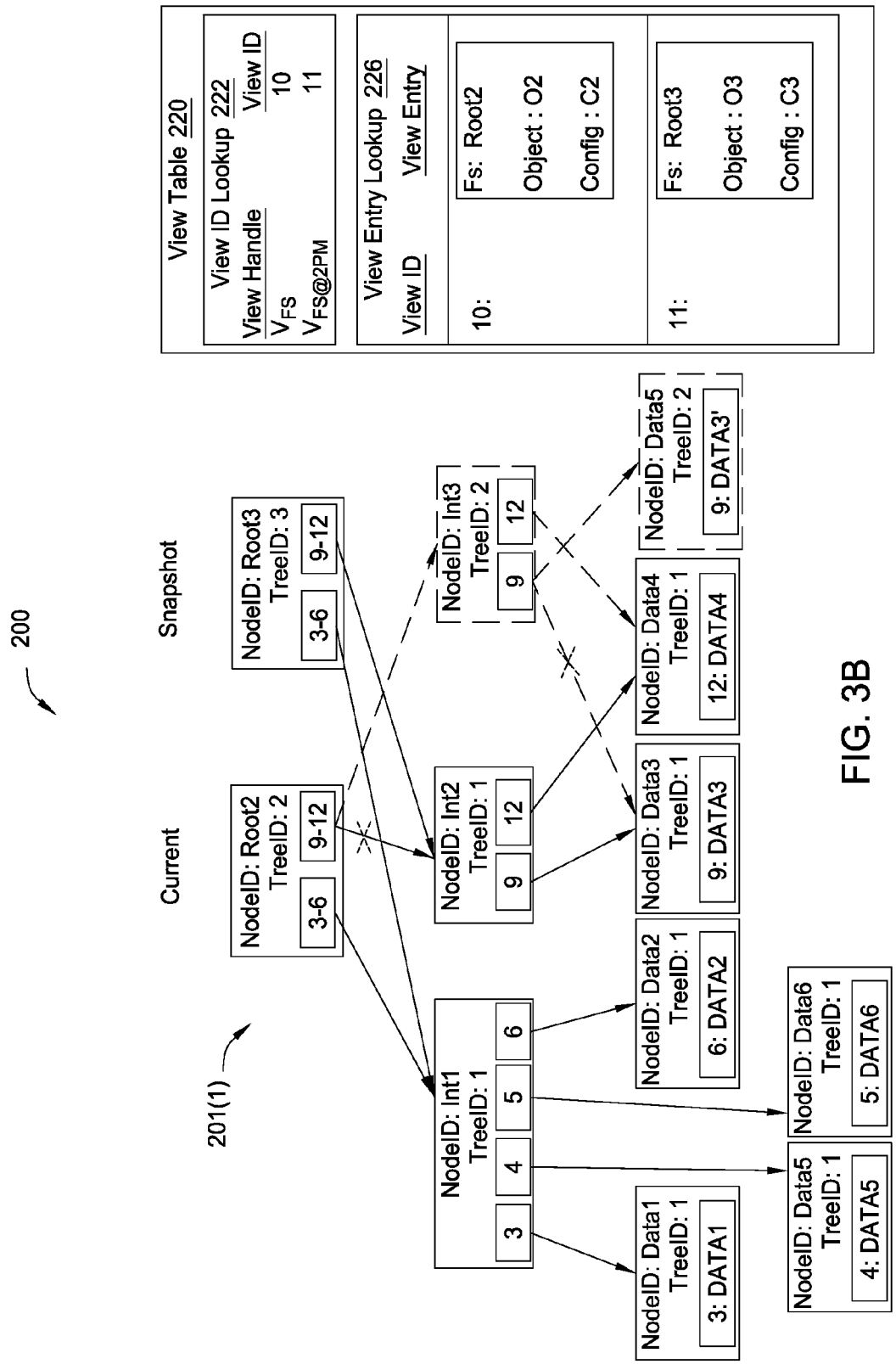
FIG. 3B illustrates modifying, for the current view, metadata associated with a particular metadata key, after a snapshot has been taken, according to one embodiment.

FIG. 3B illustrates modifying metadata associated with a particular metadata key in the current view, after a snapshot has been created. After creating a snapshot, nodes with at least three different treeIDs exist. Specifically, a treeID assigned to the immediately previous current view, a treeID assigned to the now-current view, and a treeID assigned to the snapshot exist. Of course, after many snapshots are created, a tree may include nodes with many more than three different tree ID's. That is, a tree may have many root nodes, each associated with different tree ID's.

After a snapshot is made, the current view still accepts changes to metadata. However, because a snapshot exists, the metadata stored in leaf nodes pointed to by both the snapshot view and the current view is generally not changed by "new" data for the current view, because the snapshot represents a perspective of the file system metadata that is "frozen" in time. Thus, in order change file system metadata stored at a particular node for the current view, the distributed metadata manager 110 copies that node.

For example, the distributed metadata manager 110 may modify metadata associated with a particular metadata key (and with the current view) by traversing from the root node of the current view towards a "target node;" which is the leaf node that stores the value associated with the metadata key. As described above, pointers in each node includes information that indicates what metadata keys can be found by following that pointer. Thus, the distributed metadata manager 110 traverses the metadata tree 201 towards the target node by repeatedly identifying and following the pointers that point towards the metadata key.

The distributed metadata manager 110 traverses the metadata tree 201 until reaching a node with a treeID different from the treeID associated with the current view. Note, the treeID associated with the current view is the treeID of the root node that is associated with the current view in the view table 220. At this point, the distributed metadata manager 110 creates a copy of the node with the different treeID, and assigns a treeID to the copy that matches the treeID of the current view. That is, to modify the current view (e.g., to write a new value to a metadata key), the metadata manager 110 generates a new "branch" of the tree that is local to the current view and preserves an "old" branch of the tree associated with a different treeID (e.g., a treeID of another snapshot). A copy of an intermediate node (now associated with the current view) has the same pointers as the intermediate node that was copied. A copy of a leaf node has the same metadata-key-value pair as that leaf node. After copying the node, the distributed metadata manager 110 modifies pointers of the parent of the copied node to point to the newly generated copy. Note, copies do not have the same NodeIDs as the node being copied, so that the distributed node manager 111 is able to identify each node. That is, a node is a copy only at the logical level of the tree structure and not at the logical level associated with the distributed node manager 111.

After creating the copied node and modifying the pointer of the parent node, the distributed metadata manager 110 continues traversing down the file system metadata tree 201 and compares the treeID of each encountered node with the treeID associated with the current view. Again, if the distributed metadata manager 110 encounters a treeID that is different from the treeID of the current view, the distributed metadata manager 110 copies that node and modifies the pointer of the parent node as described above. The distributed metadata manager 110 continues traversing the file system metadata tree 201 (copying nodes identified by the corresponding treeID as needed) until reaching the target node to be modified. Like the intermediate nodes, the metadata manager 110 creates a local copy of the leaf node for the current view if the treeID of the leaf node is different from the treeID of the current view. The distributed metadata manager 110 then modifies that leaf node, which includes the metadata key and the metadata to be modified.

As shown in FIG. 3B, the node to be modified for the current view is node Data3, which has a treeID of 1. To modify this node, distributed metadata manager 110 begins at the root node for the current view, which is Root2. Next, the distributed metadata manager 110 traverses the file system metadata tree 201(1) towards node Data3. Since Data3 has a metadata key of 9, distributed metadata manager 110 follows the pointer to node Int2. The distributed metadata manager 110 determines that the treeID for Int2 (1) is different from the treeID for Root2 (2), and therefore makes a copy of Int2, which is Int3.

Distributed metadata manager 110 also modifies the pointer from the parent of Int2 to instead point to the copy, Int3. The copy, Int3, has the same pointers as Int2. Next, the distributed metadata manager 110 traverses further towards Data3, following the now-modified pointer from Root2 to Int3. Because Int3 has the same treeID as Root2, distributed metadata manager 110 does not copy any nodes, and simply follows the pointer towards Data3. The distributed metadata manager 110 examines Data3 and determines that the treeID of Data3 (1) is different from the treeID of Root2. Therefore, the distributed metadata manager 110 creates a copy of Data3, which is node Data5. The copy—Data5—includes the same metadata-key-value pair as Data3. Additionally, the distributed metadata manager 110 modifies the pointer of Int3 to point to Data5 instead of Data3. Finally, distributed metadata manager 110 modifies the value in Data5 as requested. The modified value is indicated as Data3'.

Distributed metadata manager 110 may also add a value associated with a metadata key that is not currently in a file system metadata tree 201. To add such a value, the distributed metadata manager 110 traverses the file system metadata tree 201 towards a target node (here, a target node is an intermediate node that includes pointers that span a range of metadata keys include the metadata key corresponding to the value to be added), copying nodes that have a treeID that is different from the treeID of the root node associated with the current view. The distributed metadata manager 110 continues to traverse the file system tree until arriving at the target node. Of course, if the tree 201 is small, then the target node may simply be the root node. The distributed metadata manager 110 simply creates a new leaf node with the metadata-key-value pair as requested, and adds a pointer in the target node that points to the newly created leaf node.

To delete a value associated with a particular metadata key, the distributed metadata manager 110 traverses the file system metadata tree 201, until arriving at a target node (here, a target node is an intermediate node that includes pointers that span a range of metadata keys include the metadata key corresponding to the value to be added), copying each node whose treeID is different from the treeID of the root node of the current view as described above (each node with a different treeID up to and including the leaf node is copied). The distributed metadata manager 110 deletes the leaf node having the indicated metadata key and the same treeID as the root node, and removes the pointer from the parent of that leaf node to the leaf node.

As described above, root nodes and intermediate nodes have a maximum degree $t_{max}$, and intermediate nodes have a minimum degree $t_{min}$. If adding or deleting a node would cause the degree of an intermediate node to exceed $t_{max}$ or drop below $t_{min}$, or would cause the degree of a root node to exceed $t_{max}$, then certain additional operations are performed, as described below. Representing file system metadata as a file system metadata tree 201 provides several benefits. First, the process of creating a snapshot of a file system is $O(t_{max})$, or in other words has a constant-order time complexity, since the maximum number of pointers to be copied is equal to $t_{max}$. Thus, snapshots can be taken quickly and frequently. Second, modifying a node has $O(\log(N))$, where N is the number of leaf nodes, or in other words has logarithmic time complexity, since the number of nodes that are traversed to modify a node is equal to the tree depth, which is bounded by $\log(N)$. Thus, modifying the file system metadata is a quick procedure.

Figure 4A:
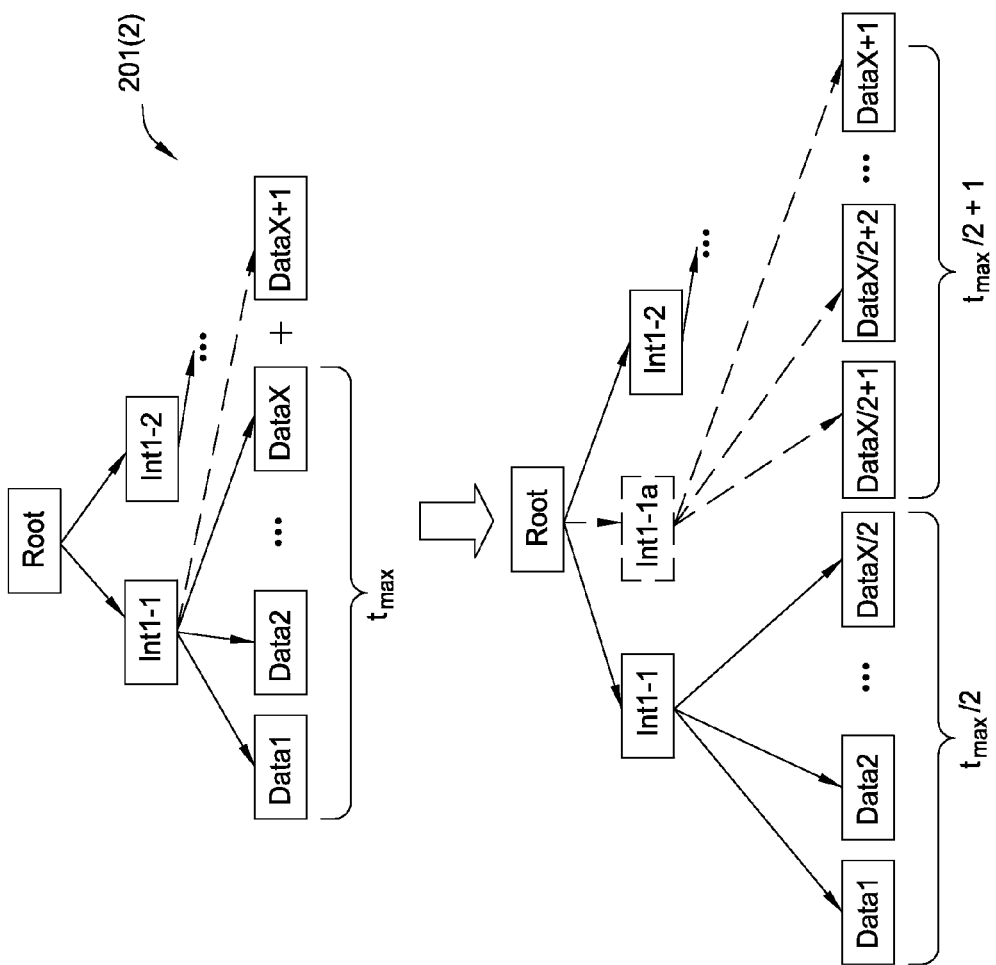
FIG. 4A illustrates adding a leaf node in a file system metadata tree that would cause the degree of a particular node to exceed $t_{max}$, according to one embodiment.

FIG. 4A illustrates adding a leaf node in a file system metadata tree 201(2) that would cause the degree of a particular node to exceed $t_{max}$. As described above, when distributed metadata manager 110 determines that a leaf node should be added, distributed metadata manager 110 traverses through the file system metadata tree 201 until arriving at the lowest intermediate node below which the metadata key for the node to be added would fit, and adds the node below that intermediate node, copying any nodes that have a treeID different from the treeID of the root for the current view along the way. Distributed metadata manager 110 copies such nodes as described above.

While traversing through the file system metadata tree 201, the distributed metadata manager 110 checks each encountered node to determine if that node has a degree that is equal to $t_{max}$. If the degree of such a node is equal to $t_{max}$, then the distributed metadata manager 110 splits that node. More specifically, the distributed metadata manager 110 creates a new intermediate node and transfers half of the pointers from the encountered node with the degree equal to $t_{max}$ to this new intermediate node. The distributed metadata manager 110 also adds a new pointer in the parent of the encountered node that points to the new intermediate node, and modifies the pointer within the parent node that points to the encountered intermediate node to correctly reflect the metadata keys now in the encountered intermediate node.

Splitting intermediate nodes in this manner proactively conditions the file system metadata tree 201 so that intermediate nodes do not have too many children. If the degree of a node encountered while traversing through the file system metadata tree 201 is not equal to $t_{max}$, then the distributed metadata manager 110 does not split the node. If a root node is split in this manner, then distributed metadata manager 110 creates a new root node that points to the two pieces of the split root node, effectively increasing the number of levels in the file system metadata tree 201 by 1. If the distributed metadata manager 110 creates a new root node, then the distributed metadata manager 110 modifies the corresponding view entry in the view table 220 to point to the newly created root node.

In the example depicted in FIG. 4A, the distributed metadata manager is adding a new leaf node, indicated as DataX+1. (For clarity, the node ID's, treeID's, and keys are not depicted in FIG. 4A). Distributed metadata manager 110 determines, based on the metadata key for DataX+1, that DataX+1 belongs under intermediate node Int1-1. Because Int1-1 already has a degree equal to $t_{max}$, distributed metadata manager 110 splits Int1-1 into Int1-1 and Int1-1a. Further, distributed metadata manager 110 creates a new pointer in Root that points to Int1-1a, and distributes half of the keys from Int1-1 to Int1-1a, modifying the pointers for Int1-1 and Int1-1a as needed. Distributed metadata manager 110 determines that the degree of Root does not exceed $t_{max}$, and therefore does not split the Root.

Figure 4B:
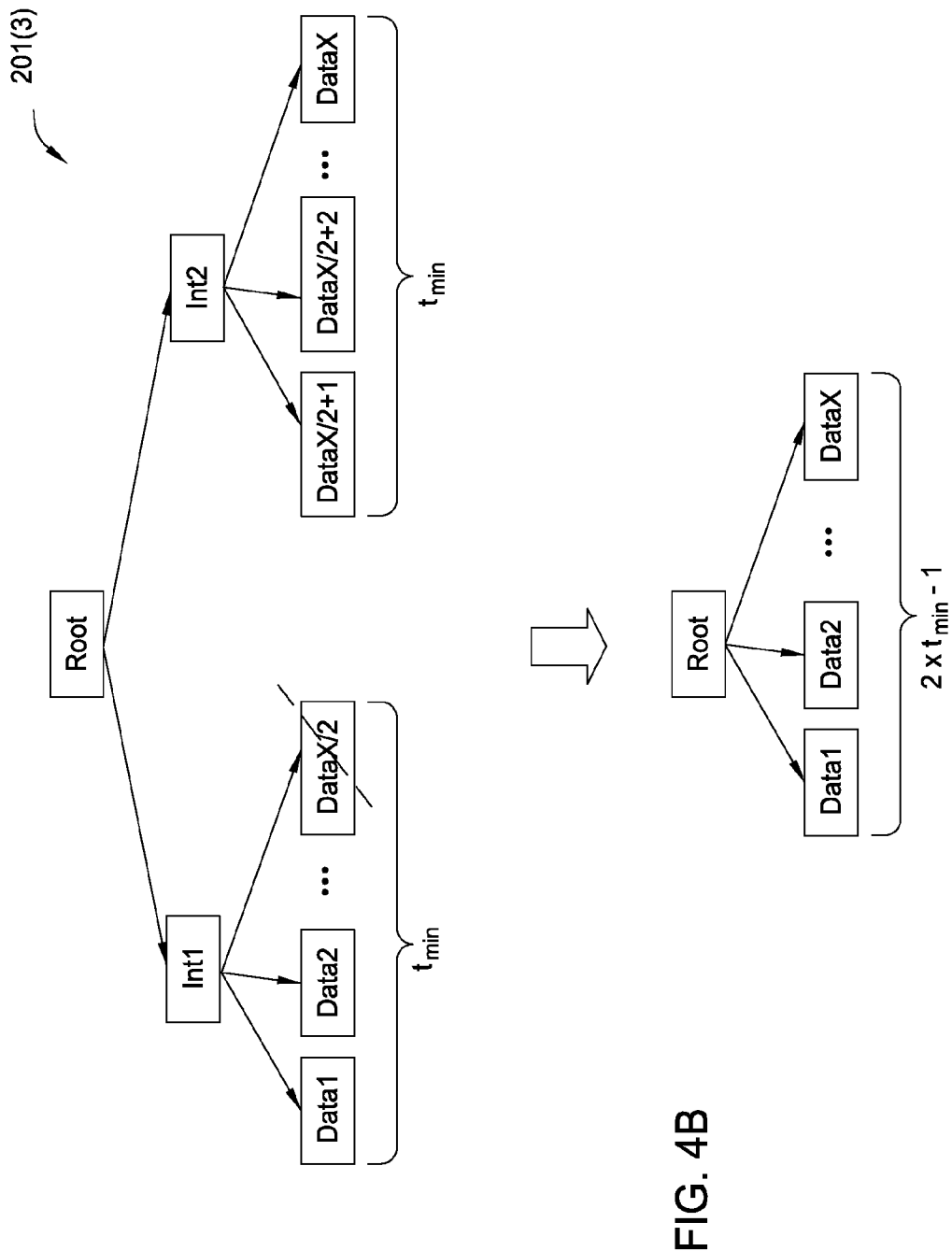
FIG. 4B illustrates deleting a leaf node in a file system metadata tree that would cause the degree of a particular node to fall below $t_{min}$, according to one embodiment.

FIG. 4B illustrates removing a leaf node in a file system metadata tree 201(3) that would cause the degree of a particular node to fall below a minimum threshold, according to one embodiment. For simplicity, the treeID of each node in FIG. 4B is assumed to be identical. When distributed metadata manager 110 determines that a leaf node should be deleted, distributed metadata manager traverses through the file system metadata tree 201 until arriving at the intermediate node whose direct child is the node to be deleted, and deletes that direct child.

While traversing the file system metadata tree 201, the distributed metadata manager 110 checks each encountered node to determine if that node has a degree that is equal to $t_{min}$. If the degree of such a node is equal to $t_{min}$, then the distributed metadata manager 110 attempts to "shuttle" metadata keys from other nodes that are siblings of the encountered node to the encountered node. Two (or more) nodes are siblings when they share a direct parent node. Shuttling transfers metadata keys from one or more siblings of the encountered node such that the encountered node and the siblings each have a degree that is at least equal to $t_{min}$.

If shuttling would still result in the encountered node (or any siblings) having a degree that is less than $t_{min}$, then distributed metadata manager 110 does not perform shuttling. Instead, distributed metadata manager 110 combines the encountered node with at least one sibling of the encountered node. More specifically, the distributed metadata manager 110 deletes either a sibling or the encountered node or the encountered node itself and stores keys from the deleted node in the remaining sibling. The distributed metadata manager 110 also modifies pointers of the parent of the encountered node to reflect the fact that a node has been deleted. If a node has a degree that is not equal to $t_{min}$, then the distributed metadata manager 110 does not perform the steps described above for that node.

If the above-described technique would cause the degree of a root node to equal 1, and the direct child of that root node is not a leaf node, then distributed metadata manager 110 deletes the root node and converts the direct child of the root node into the root node, with appropriate changes to the view table 220 as described above (i.e., modify the appropriate view entry to point to the new root node instead of the old root node).

FIG. 4B illustrates an example of a leaf node being deleted from a file system metadata tree that would cause the degree of a particular node to fall below $t_{min}$, according to one embodiment. In the example file system metadata tree 201(3) illustrated in FIG. 4B, the distributed metadata manager 110 processes a command to delete node DataX/2. For simplicity, the treeID of each node in FIG. 4B is assumed to be identical (in practice if not, nodes are copied as described above). The distributed metadata manager 110 traverses the file system metadata tree 201(3), arriving at Int1. The distributed metadata manager 110 determines that deleting DataX/2 would decrease the degree of Int1 below $t_{min}$, and thus attempts to perform shuttling. Because Int2 has a degree equal to $t_{min}$, the distributed metadata manager 110 combines Int1 with sibling Int2. Thus, the distributed metadata manager 110 deletes Int2 and transfers metadata keys from Int2 to Int1. Because Int1 is the only direct child of the root node, distributed metadata manager 110 deletes the root node and converts Int1 into the root node.

Traversing File System Metadata Trees Using Locks

Distributed lock authority 108 accepts requests for locks on nodes in a file system metadata tree 201. Before a distributed metadata manager 110 reads a particular node, the distributed metadata manager 110 obtains a read-lock for that node from a distributed lock authority 108. Similarly, before a distributed metadata manager 110 writes to a particular node, the distributed metadata manager 110 obtains a write-lock on that node from the distributed lock authority 108. When reading a leaf node, writing to a leaf node, adding a node, or deleting a node, the distributed metadata manager 110 obtains and releases locks from the distributed lock authority 108 in particular sequences. Several operations on a file system metadata tree 201, and the corresponding sequences of obtaining and releasing locks from a distributed lock authority 108, are now described with respect to FIGS. 5A-5D.

Figure 5A:
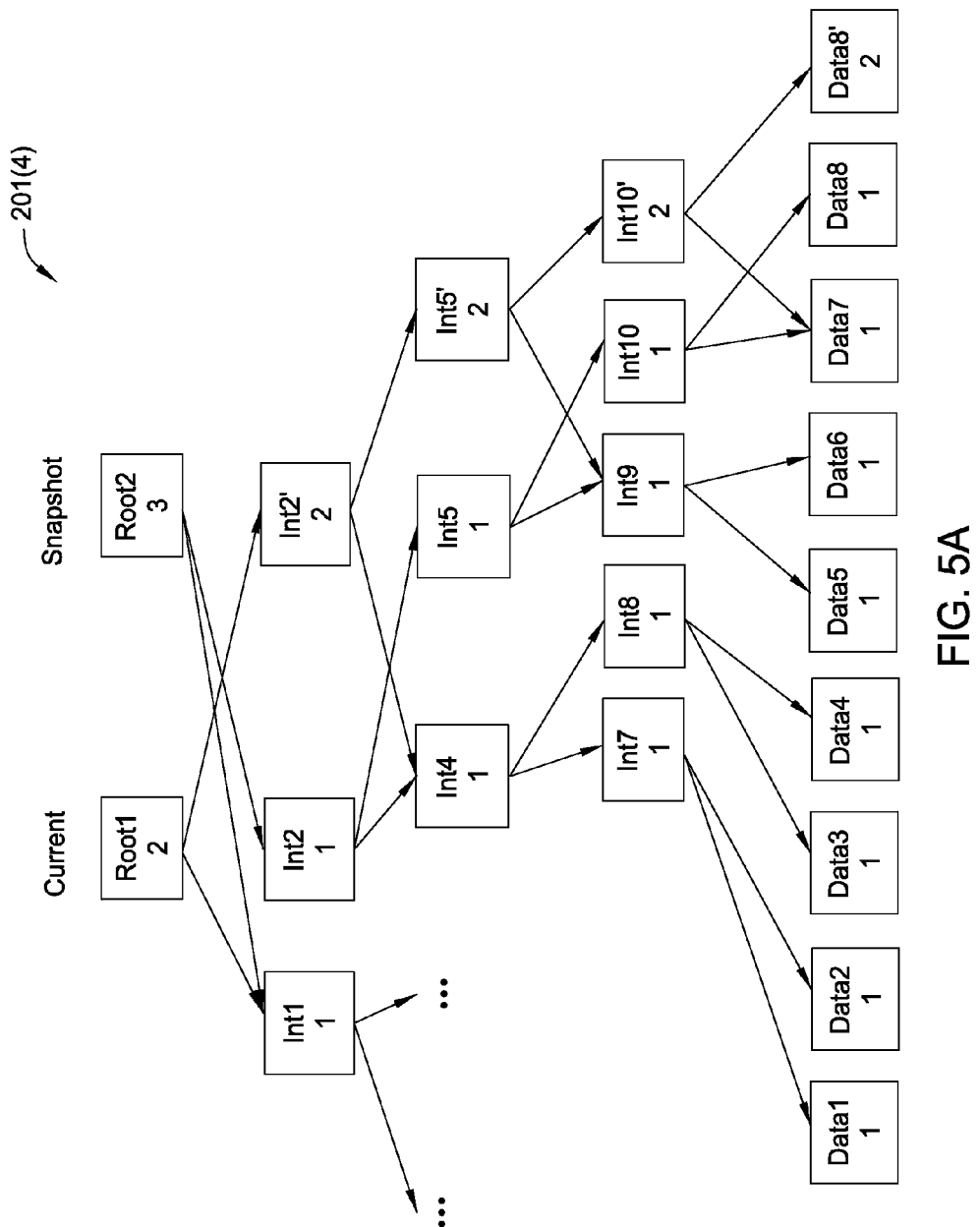
FIGS. 5A and 5B illustrate a read operation, and an associated sequence of acquiring and releasing synchronization locks, according to one embodiment.
Figure 5B:
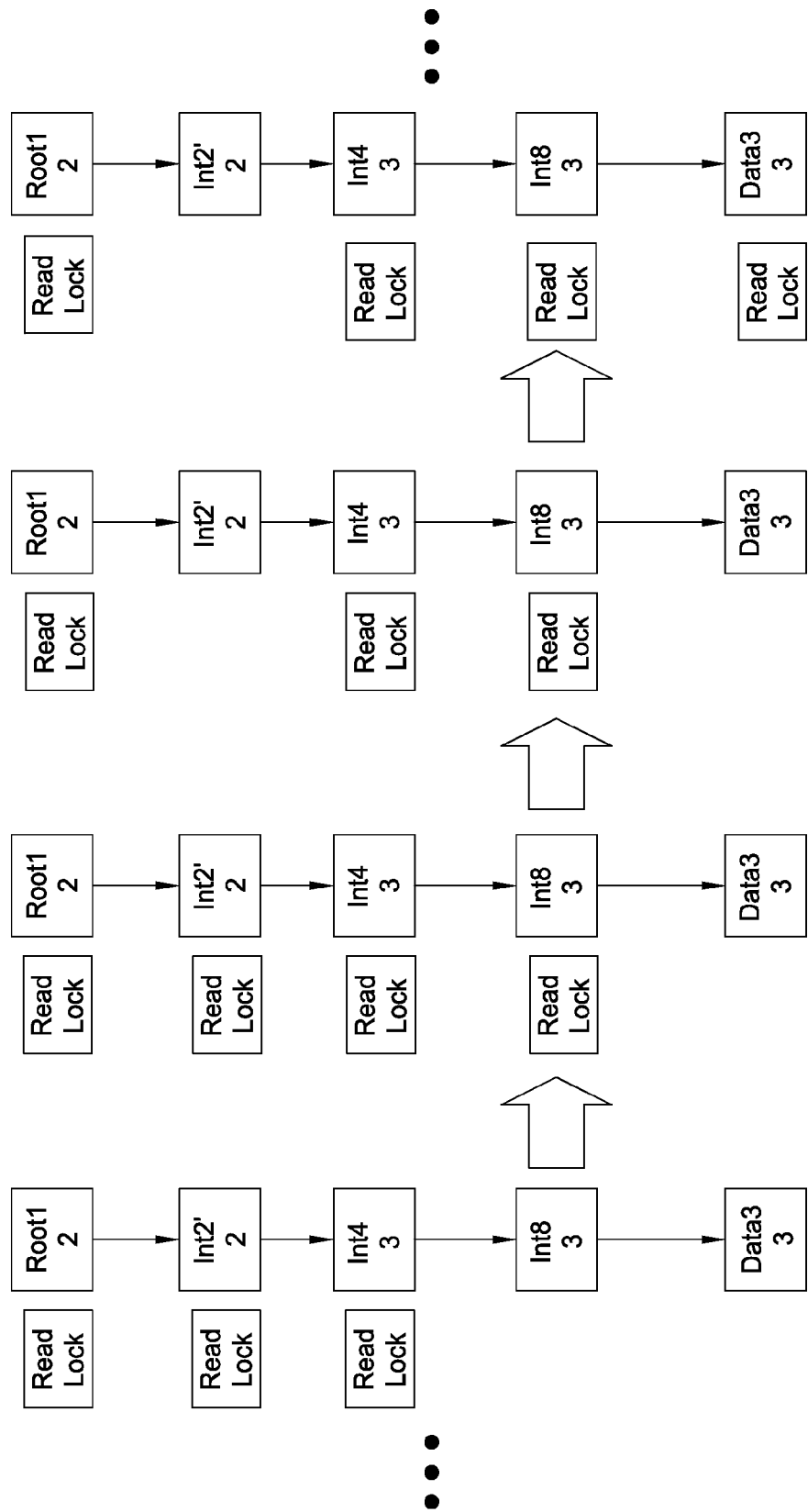

FIG. 5A illustrates a sequence of locks obtained for reading a leaf node in a file system metadata tree 201(4), according to one embodiment. As shown, the file system metadata tree 201(4) includes a current view, associated with Root1 and a snapshot view, associated with Root2. Data has already been written to Data8 in the current view, and so copies of Int2, Int5, Int10, and Data8 exist with a treeID matching the treeID of Root1 (2). Root2 has a treeID of 3. The rest of the file system metadata tree 201(4) has treeID of 1. For clarity, elements such as the metadata keys and node IDs are not depicted. FIG. 5B illustrates a sequence of states for selected nodes in the file system metadata tree 201(4) associated with reading the leaf node. For clarity, FIG. 5B does not depict all of the nodes shown in FIG. 5A.

Referring to FIGS. 5A and 5B together, the leaf node to be read is associated with a particular metadata key. To read this leaf node the distributed metadata manager 110 first obtains a read-lock on the root node associated with that view. The distributed metadata manager 110 maintains the read-lock on the root node until the entire read operation is completed (i.e., until the information is read from the leaf node). Then, the distributed metadata manager 110 follows the pointer in the root node that is associated with the range of metadata keys that includes the metadata key for the leaf node. The distributed metadata manager 110 obtains a read-lock on the next node and reads that node to determine the next node associated with a range of metadata keys that includes the metadata key for the leaf node. The distributed metadata manager 110 obtains a read-lock on that next node and continues traversing the distributed metadata tree in this manner. Whenever the distributed metadata manager 110 has read-locks on three nodes, not counting the root node, the distributed metadata manager 110 releases the read-lock on the node that is highest up in the tree (except for the root node). Maintaining a read-lock on the root node in this manner prevents clone operations from proceeding for a particular root node while read-operations or write-operations with that root node. Since a clone operation would take a write-lock on the root node, while a clone operation is proceeding, no other operation (read or write) can proceed as all other operations hold at least a read-lock on the root node.

In the example file system metadata tree 201(4) depicted in FIGS. 5A and 5B, a distributed metadata manager 110 executes a command to read the value stored in the node Data3, for the current view. The distributed metadata manager 110 begins with the root node associated with the current view, which is Root1, and acquires a read-lock on that node. The distributed metadata manager 110 examines the pointers of Root1 to determine that Int2' is the next node to read, and acquires a read-lock on that node. The distributed metadata manager 110 examines the pointers of Int2' and determines that Int4 is the next node to read, and acquires a read-lock on that node. The distributed metadata manager 110 then acquires a read-lock on Int8. Now having three read-locks on non-root nodes, the distributed metadata manager releases the read-lock on Int4. The distributed metadata manager acquires a read-lock on Data3, reads the value stored in Data3, and releases all read-locks.

Figure 5C:
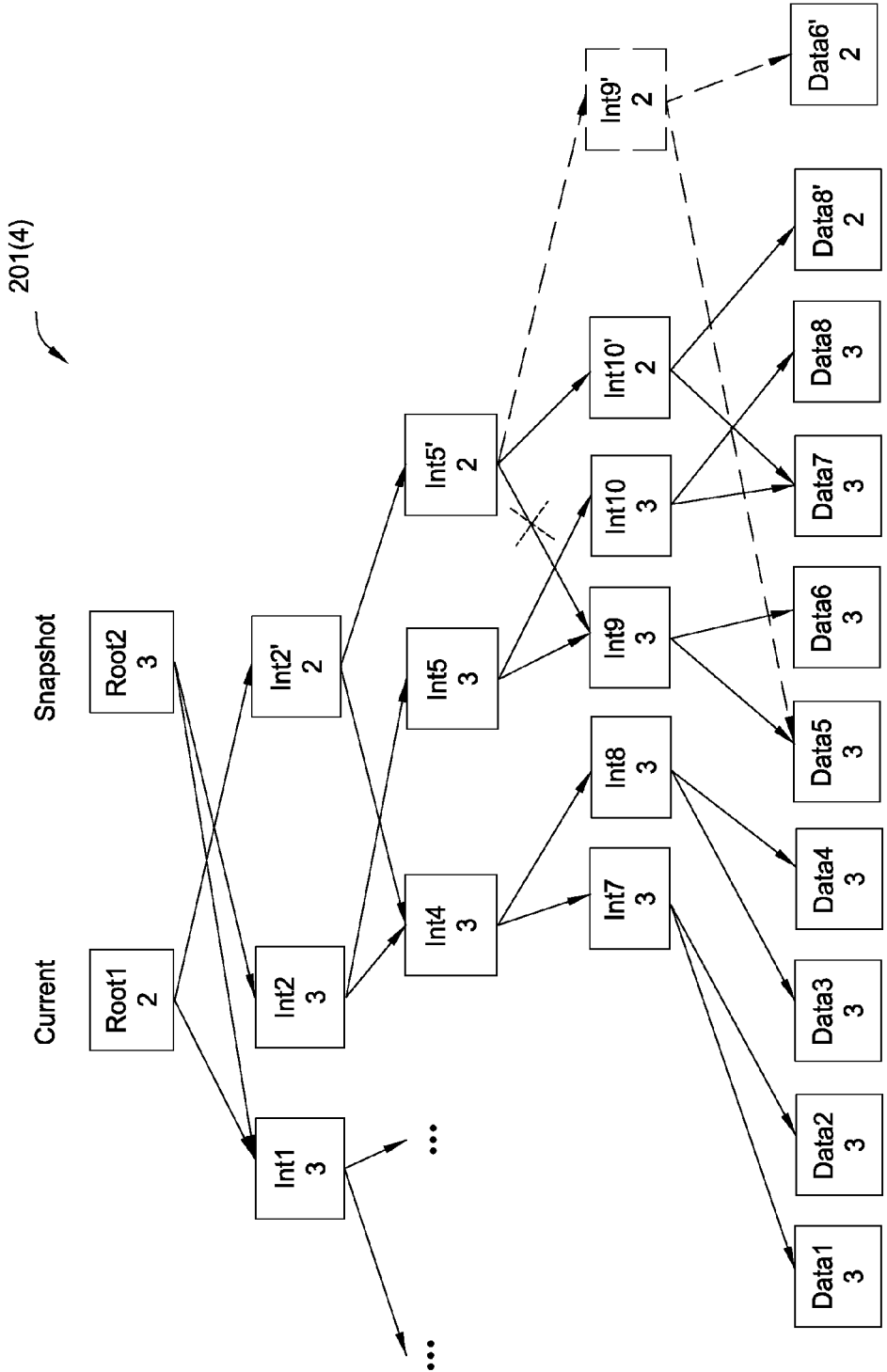
FIGS. 5C and 5D illustrate a write operation, and an associated sequence of acquiring and releasing synchronization locks, according to one embodiment.

FIG. 5C illustrates a sequence of locks taken for writing to a leaf node in file system metadata tree 201(4), according to one embodiment. The file system metadata tree 201(4) in FIG. 5C includes additional nodes (illustrated with dashed lines) associated with a write-operation to be performed in node Data6, relative to the current view.

To write to a leaf node, a distributed metadata manager 110 acquires a read-lock on the root node for that view. Then, the distributed metadata manager 110 follows a pointer in the root node towards the leaf node. The distributed metadata manager 110 obtains a read-lock on the next node and reads the pointers in the next node to determine which branch should be followed to reach the leaf node. The distributed metadata manager 110 continues traversing the tree in a manner similar to what is described above for the read-operation. The distributed metadata manager 110 maintains the read-lock on the root node as described above as well.

However, if the distributed metadata manager 110 encounters a node with a treeID different from the treeID associated with the view being modified, then the distributed metadata manager 110 does not obtain another read-lock for the node at the next level. Instead, the distributed metadata manager 110 releases the read-lock on the parent of the encountered node. The distributed metadata manager 110 acquires a write-lock on the parent of the encountered node that has the treeID that is different than the treeID of the root node. Once the write-lock is acquired on the parent of the encountered node, the distributed metadata manager 110 determines whether the parent node has changed from when that parent node was released.

If the parent node has not changed, then the distributed metadata manager 110 acquires a read-lock on the encountered node and creates a copy of the encountered node. The distributed metadata manager 110 also modifies the pointer within the parent node that points to the encountered node to instead point to the copy of the encountered node. At this point, the distributed metadata manager 110 releases the read-lock on the grandparent, and, starting from the copy of the encountered node, traverses down the file system metadata tree 201 as described above. When the distributed metadata manager 110 arrives at the leaf node to be modified, the distributed metadata manager modifies the value at that node (copying that node if warranted based on the treeID).

When the distributed metadata manager 110 acquires the write-lock on the parent node of the node that is encountered that has a treeID that is different than the root node, if the distributed metadata manager 110 determines that the parent node has changed, since the read-lock on the parent node was released, then the distributed metadata manager 110 simply restarts the whole procedure, beginning with acquiring a read lock on the root node and traversing into the tree. Distributed metadata manager 110 restarts this procedure because distributed metadata manager 110 does not have locks on a sufficient number of nodes. For example, assume that distributed metadata manager 110 holds a read-lock on nodes N, C, and GC, where N is a node, C is the child of N and GC is the grandchild of N. When the distributed metadata manager 110 inspects GC, distributed metadata manager 110 determines that GC should be modified. Therefore, distributed metadata manager 110 releases the locks on GC and C and take a write-lock on C. After obtaining this write-lock on C and reading the contents of C, distributed metadata manager 110 determines that C has changed in the time between giving up the read-lock and acquiring the write-lock and needs to be modified as well. In order to modify C, distributed metadata manager 110 might determine that distributed metadata manager 110 should obtain a write-lock on N and a read-lock on the parent of N (e.g., if N has a treeID different than the root node). However, since distributed metadata manager 110 may not hold a read-lock on the parent of N, distributed metadata manager 110 gives up all locks and restarts the entire procedure from the beginning.

Figure 5D:
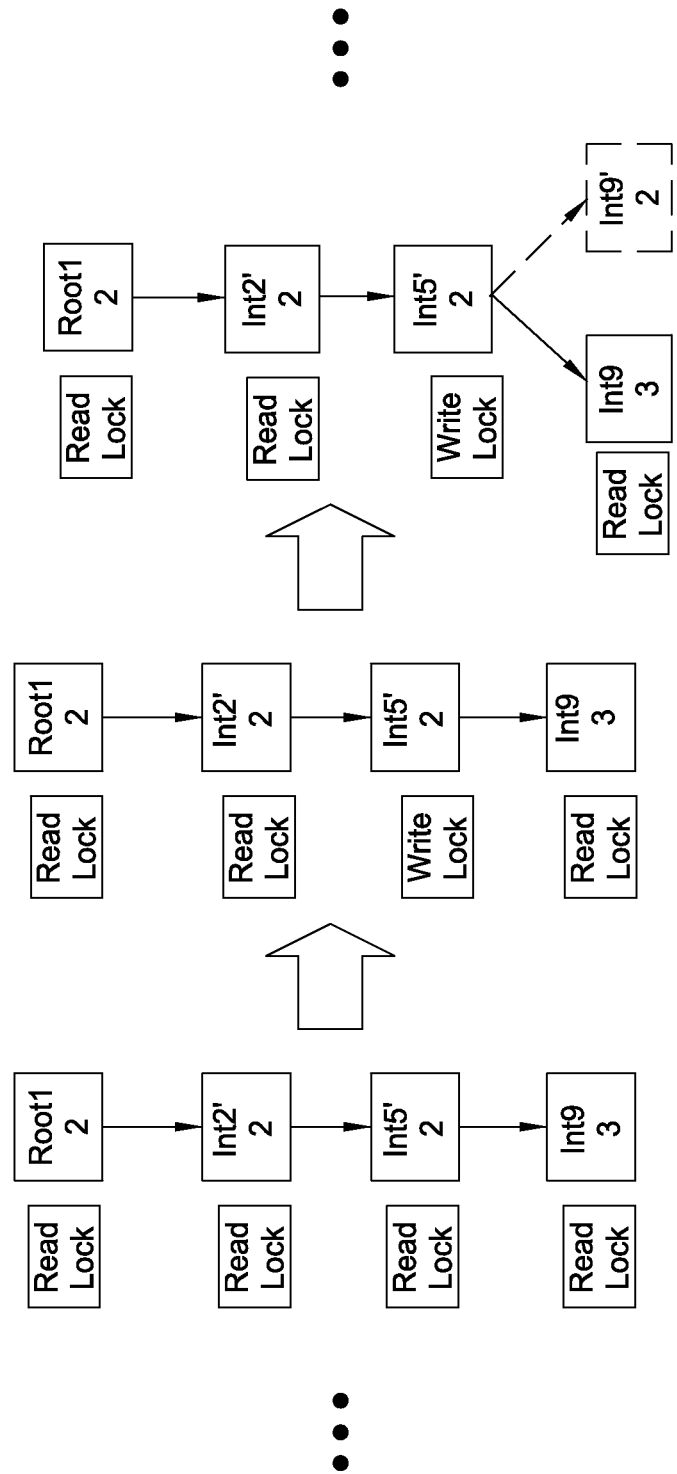

In the example file system metadata tree 201(4) depicted in FIGS. 5C and 5D, a distributed metadata manager 110 executes a command to modify the value stored in Data6, for the current view. The distributed metadata manager 110 obtains a read-lock on Root1, a read-lock on Int2', a read-lock on Int5', and a read-lock on Int9. The distributed metadata manager 110 determines that the treeID for Int9 (3) is different from the treeID for Int5' (2). The distributed metadata manager 110 releases the read-lock on Int5' and Int9 and obtains a write-lock on Int5' and a read-lock on Int9. Then the distributed metadata manager 110 creates a copy of Int9, which is Int9'. The distributed metadata manager 110 modifies the pointer from Int5' to Int9 to instead point to the copy, Int9'. The distributed metadata manager 110 obtains a read-lock on Int9' and releases the read lock on Int2'. The distributed metadata manager 110 obtains a read-lock on Data6 and determines that the treeID of data6 (3) is different from the treeID of Root1 (2). Thus, the distributed metadata manager 110 releases the read-locks on Int9' and Data6 and obtains a write-lock on Int9' and a read-lock on Data6. The distributed metadata manager 110 creates a copy of Data6, which is Data6', and modifies the pointer of Int9' to instead point to Data6'. Then, the distributed metadata manager 110 obtains a write-lock on Data6', modifies the value stored in Data6', and releases all locks.

In addition to modifying the value stored in a leaf node, the distributed metadata manager 110 may also add a node or delete a node. Adding a node is similar to modifying the value in a leaf node. However, instead of traversing down to a leaf node, the distributed metadata manager 110 traverses down to an intermediate node that would include a pointer to the leaf node, based on the metadata keys stored in the intermediate node, creates a new leaf node, and modifies the intermediate node to include a pointer to the newly added node. Deleting a node is also similar to modifying the value in a leaf node. However, instead of traversing down to a leaf node, the distributed metadata manager 110 traverses to an intermediate node that includes the pointer to the node to be deleted, taking read-locks and write-locks as described above. If the intermediate node that includes the pointer to the node to be deleted is the only node that points to the node to be deleted, then the distributed metadata manager 110 deletes the node to be deleted. If the intermediate node that includes the pointer to the node to be deleted is not the only node that points to the node to be deleted, then the distributed metadata manager 110 does not delete that node. The distributed metadata manager 110 can determine whether the intermediate node is the only node that points to the node to be deleted by maintaining a count of the number of nodes that point to any particular node.

Caching System

In one embodiment, each storage appliance 106 stores a local cache 112 of nodes retrieved by distributed metadata manager 110. Because multiple storage appliances 106 may each access a local copy of a particular node, the storage appliances 106 need to determine whether cached data remains valid.

Figure 6:
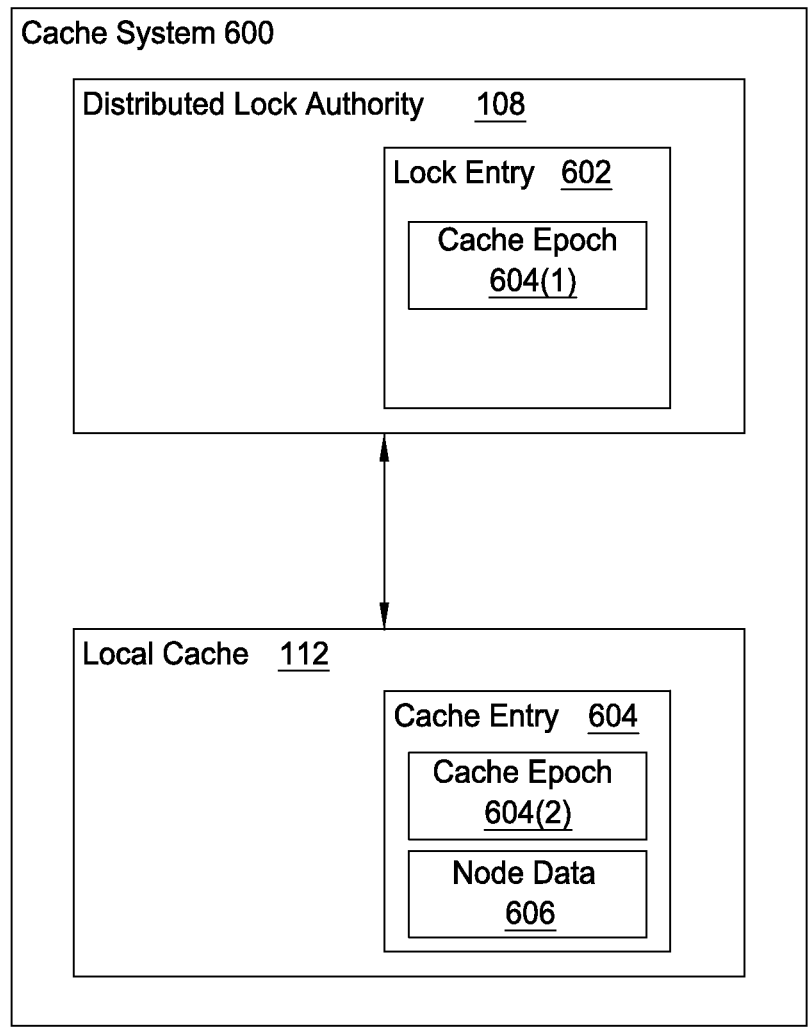
FIG. 6 illustrates a cache system for caching metadata stored in a metadata tree structure, according to one embodiment.

FIG. 6 illustrates a cache management system 600 that includes distributed lock authorities 108 within the storage appliances 106 and a local cache 112 stored on one of the storage appliances 106. When a storage appliance 106 first accesses a particular node, the storage appliance 106 stores that node in the local cache 112. As described above, when a storage appliance 106 accesses a node, the storage appliance obtains a lock from the distributed lock authority 108. When a storage appliance 106 obtains a lock from a distributed lock authority 108, the distributed lock authority 108 stores an indication (a lock entry 602) that the lock exists for a particular node and also stores a value referred to as a cache epoch 604 for that node. Each time the distributed lock authority 108 grants a write-lock for a particular node, the distributed lock authority 108 increments the cache epoch for the node by one.

When accessing a node, the distributed metadata manager 110 determines whether a copy stored in a local cache 112 is valid (if in the cache at all). To do so, the distributed metadata manager 110 obtains a read lock from the distributed lock authority 108 and determines the current cache epoch 604(1) for that node. If the cache epoch 604(1) read from the distributed lock authority 108 is equal to the cache epoch 604(2) stored in the local cache 112, then the copy of the node stored in the local cache 112 is valid. If the cache epochs do not match, then the copy of the node stored in the local cache is invalid. Note that even if distributed metadata manager 110 has a read-lock on a particular node, cache validity for that node is not guaranteed. This is because the distributed metadata manager 110 may have given the read-lock up at a prior time and then acquired a new read-lock on that node. In the period in which the distributed metadata manager 110 did not have a lock on the node, the node may have changed and thus the cached version of the node may no longer be valid.

Figure 7:
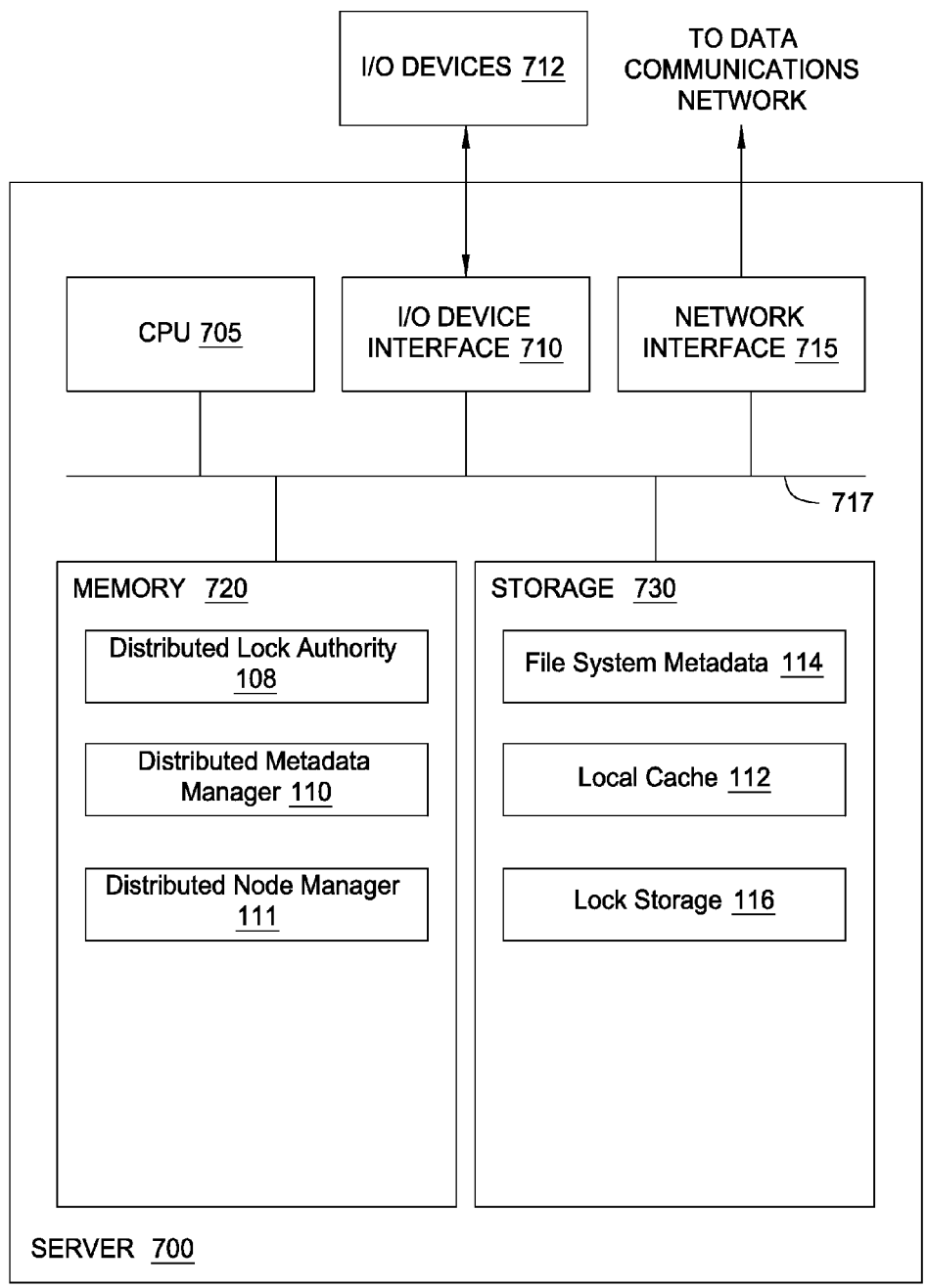
FIG. 7 illustrates an example server configured to perform the functionality of the storage appliance of FIG. 1, according to one embodiment of the present invention, according to one embodiment.

FIG. 7 illustrates an example server 700 configured to perform the functionality of the storage appliance 106, according to one embodiment of the present invention. As shown, the server 700 includes, without limitation, a central processing unit (CPU) 705, a network interface 715, a memory 720, and storage 730, each connected to a bus 717. The server 700 may also include an I/O device interface 710 connecting I/O devices 712 (e.g., keyboard, display and mouse devices) to the server 700. Further, in context of this disclosure, the computing elements shown in server 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the storage 730. The interconnect 717 is used to transmit programming instructions and application data between the CPU 705, I/O devices interface 710, storage 730, network interface 715, and memory 720. Note that CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, optical storage, network attached storage (NAS), or a storage area-network (SAN). Illustratively, the memory 720 includes distributed lock authority 108, a distributed metadata manager 110, and a distributed node manager 111. Storage 730 includes file system metadata 114, local cache 112, and lock storage 116. Each element stored in memory 720 and storage 730 functions as described above.

Figure 8:
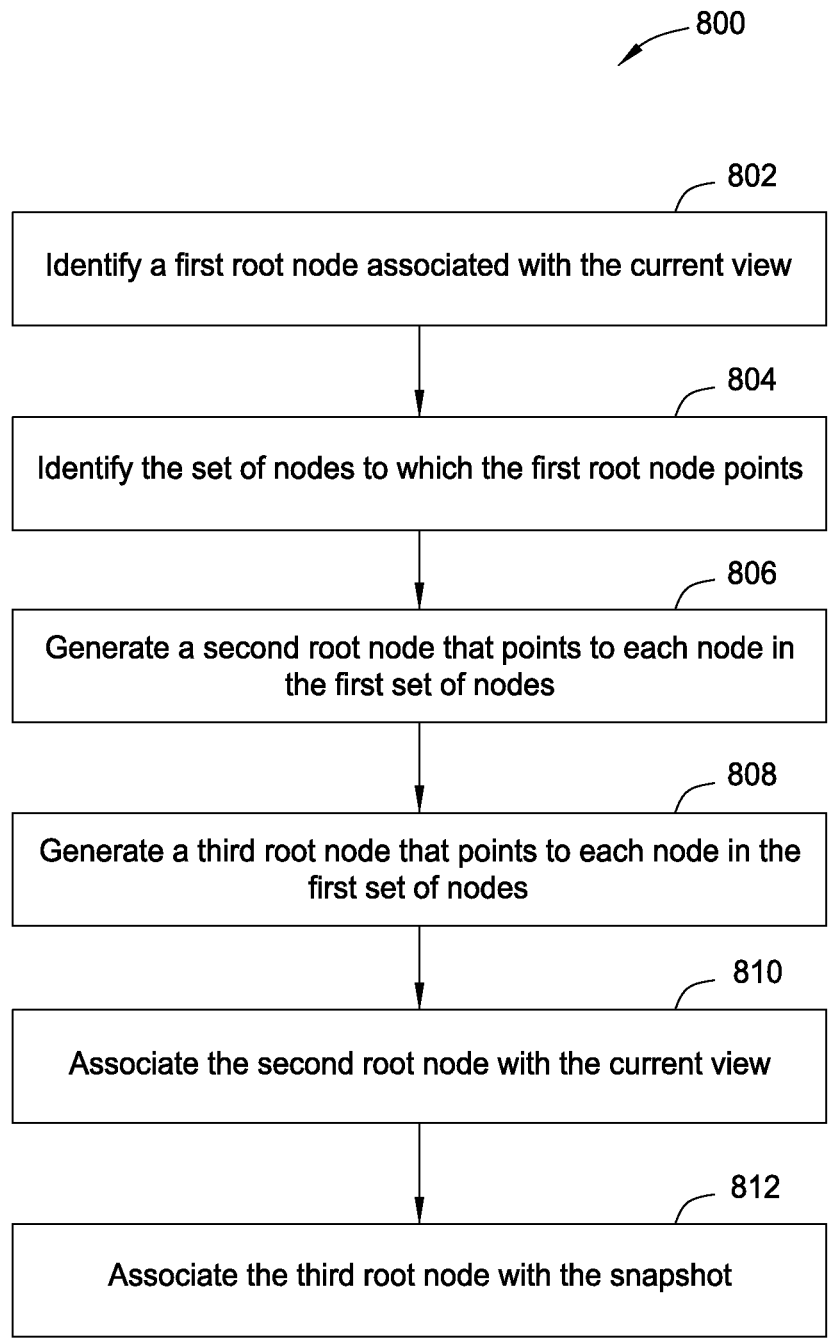
FIG. 8 is a flow diagram of method steps for creating a snapshot of a current view, according to one embodiment.

FIG. 8 is a flow diagram of method steps for creating a snapshot of a current view, according to one embodiment of the present invention. Although the method steps are described in conjunction with FIGS. 1-7, persons skilled in the art will understand that any system configured to perform the method steps, in any order, falls within the scope of the present invention.

As shown, a method 800 begins at step 802, where distributed metadata manager 110 identifies the root node that is associated with the current view. A view table 220 associates the current view with a root node as described above. At step 804, distributed metadata manager 110 identifies the set of nodes to which the root node points. At step 806, the distributed metadata manager 110 creates a second root node that is a copy of the first root node and therefore points to the same set of nodes that the first root node points to, and includes the same metadata keys as the first root node. At step 808, the distributed metadata manager 110 generates a third root node that is a copy of the first root node and therefore points to the same set of nodes that the first root node points to, and includes the same metadata keys as the first root node. At step 810, the distributed metadata manager 110 associates the second root node with the current view in the view table 220. At step 812, the distributed metadata manager 110 associates the third root node with the snapshot in the view table 220.

Figure 9:
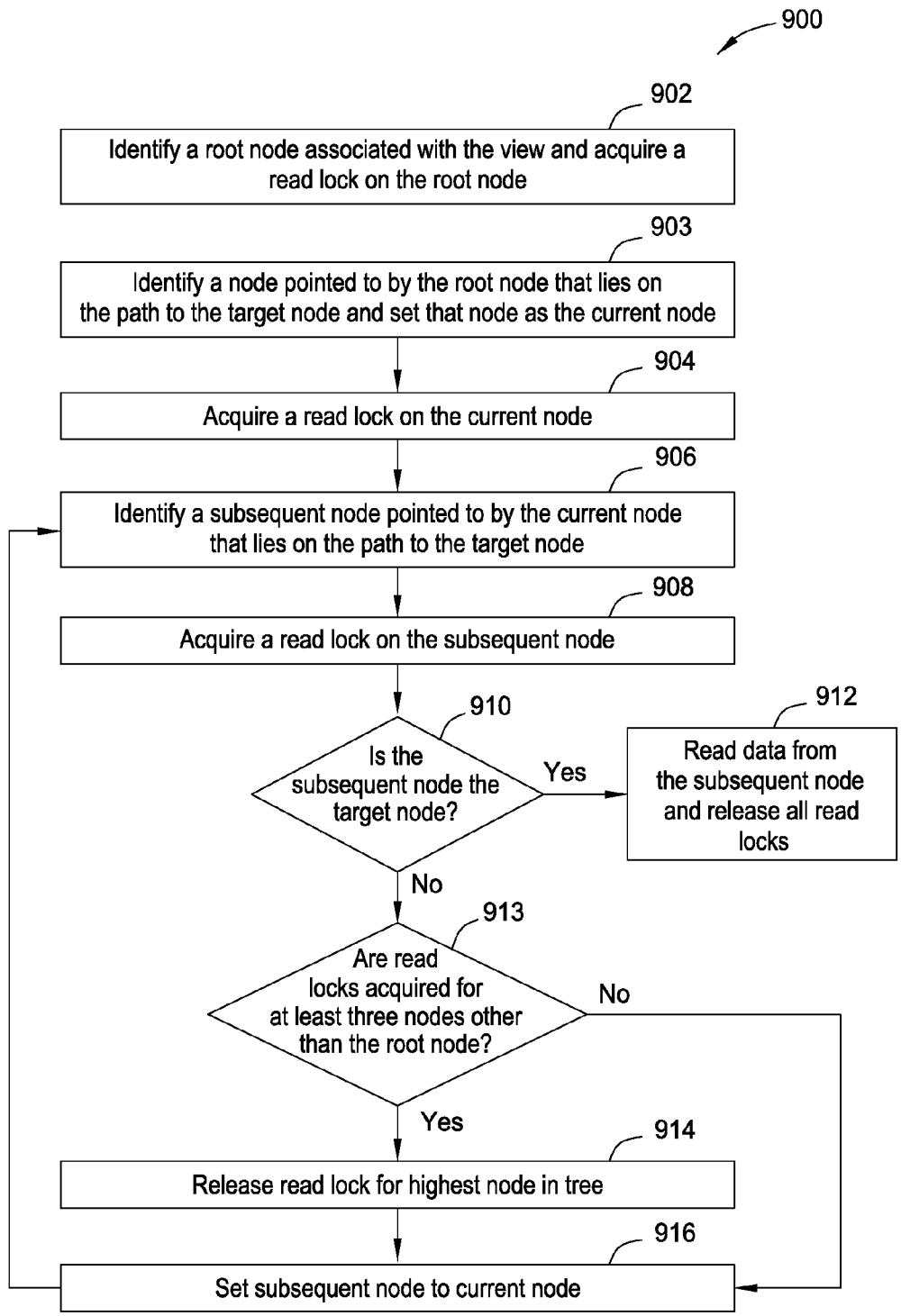
FIG. 9 is a flow diagram of method steps for reading, from a particular view, a value that is associated with a provided key, according to one embodiment.

FIG. 9 is a flow diagram of method steps for reading, from a particular view, a value that is associated with a provided metadata key, according to one embodiment of the present invention. Although the method steps are described in conjunction with FIGS. 1-7, persons skilled in the art will understand that any system configured to perform the method steps, in various alternative orders, falls within the scope of the present invention.

As shown, a method 900 begins at step 902, where the distributed metadata manager 110 identifies the root node that is associated with the view to be read from and acquires a read-lock on that root node. At step 903, the distributed metadata manager 110 identifies a node pointed to by the root node that lies on the path to the target node and sets that node as the current node. At step 904, the distributed metadata manager 110 acquires a read lock on the current node. At step 906, the distributed metadata manager 110 follows a pointer in the current node that points towards the provided metadata key and identifies the node at the end of the pointer as the "subsequent node." At step 908, the distributed metadata manager 110 acquires a read lock on the subsequent node.

At step 910, the distributed metadata manager 110 determines whether the subsequent node is the target node. The target node is the node that is the leaf node associated with the provided metadata key. If the subsequent node is the target node, then the method proceeds to step 912. At step 912, the distributed metadata manager 110 reads data from the subsequent node and releases all read-locks. If, at step 910, the subsequent node is not the target node, then the method proceeds to step 913. At step 913, the distributed metadata manager 110 determines whether there are read locks acquired for at least three nodes other than the root node. If there are read locks acquired for at least three nodes other than the root node, then the method proceeds to step 914. At step 914, the distributed metadata manager 110 releases the read-lock for the highest node in the tree structure. After step 914, the method proceeds to step 916. If, in step 913, the distributed metadata manager 110 determines that read locks are acquired for less than three nodes other than the root node, then the method proceeds to step 916. At step 916, the distributed metadata manager 110 sets the subsequent node to the current node. After step 916, the method returns to step 906.

Figure 10:
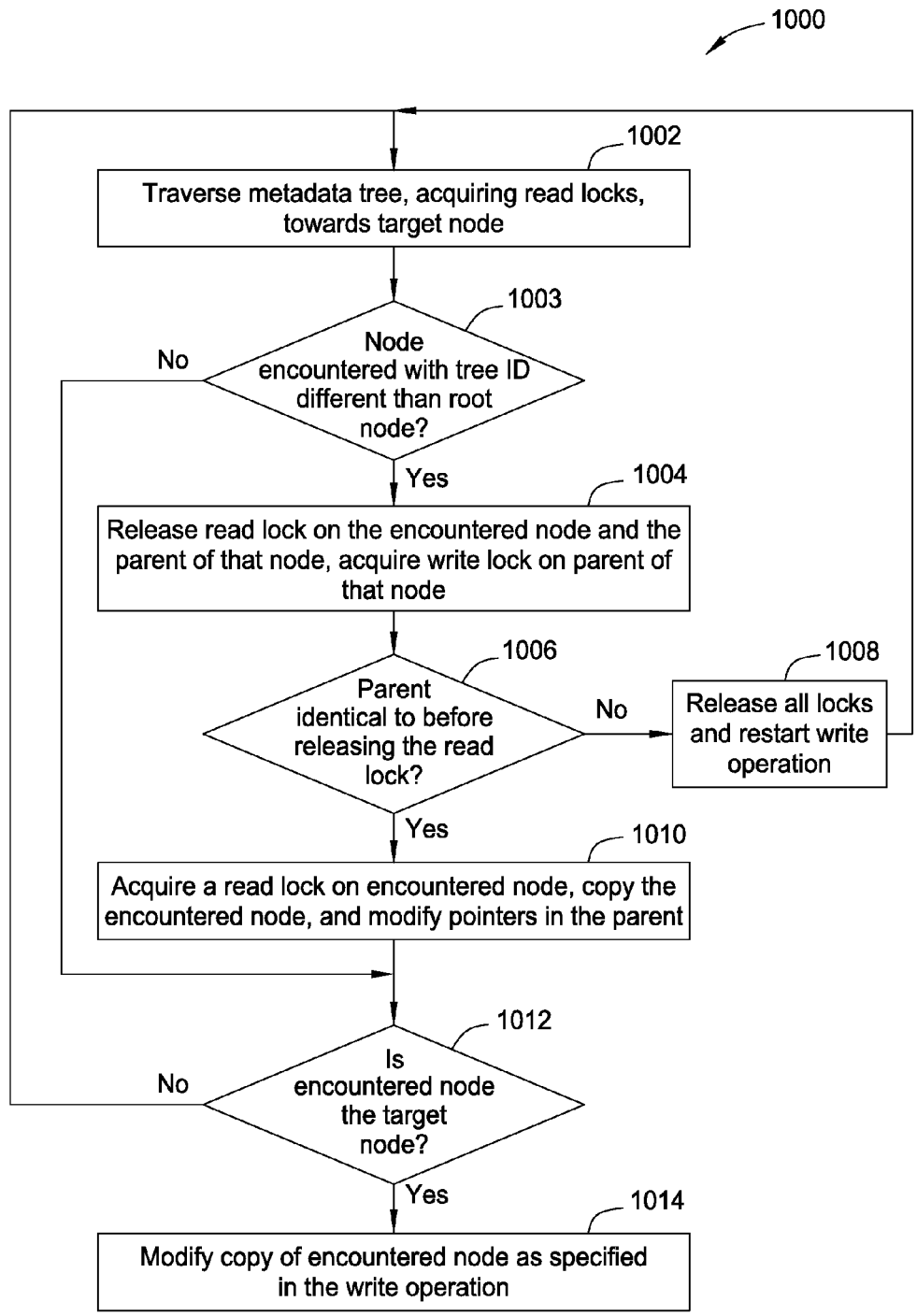
FIG. 10 is a flow diagram of method steps for writing, in a particular view, a value that is associated with a provided key, according to one embodiment.

FIG. 10 is a flow diagram of method steps for writing, in a particular view, a value that is associated with a provided metadata key, according to one embodiment of the present invention. Although the method steps are described in conjunction with FIGS. 1-7, persons skilled in the art will understand that any system configured to perform the method steps, in various alternative orders, falls within the scope of the present invention.

As shown, a method 1000 begins at step 1002, where distributed metadata manager 110 traverses the metadata tree, acquiring read locks, towards a target node. It should be understood that for a modify-value operation, the target node is the leaf node that stores that value. For an add-key operation, the target node is the intermediate node to which distributed metadata manager 110 adds a leaf node as the new node. For a delete-key operation, the target node is the intermediate node whose direct child is the leaf node for deletion. While traversing, whenever the distributed metadata manager 110 has at least three read locks on nodes other than root nodes, the distributed metadata manager 110 releases the read lock that is highest up the tree.

At step 1003, the distributed metadata manager 110 determines whether a node is encountered that has a treeID different than that of the root node. If such a node is encountered, then the method proceeds to step 1004. If no such node is encountered, then the method proceeds to step 1012. At step 1004, the distributed metadata manager 110 releases the read lock on the encountered node and the parent of that node and acquires a write lock on the parent of the encountered node. At step 1006, the distributed metadata manager 110 determines whether the parent node is identical to before releasing the read lock. If the parent node is identical, then the method proceeds to step 1010. If the parent node is not identical, then the method proceeds to step 1008, at which the distributed metadata manager 110 releases all locks and restarts the write operation. After step 1008, the method returns to step 1002.

At step 1010, the distributed metadata manager acquires a read lock on the encountered node, copies the encountered node, and modifies the pointers in the parent to point to the copy of the encountered node instead of the encountered node. At step 1012, the distributed metadata manager 110 determines whether the encountered node (either the one that was copied if the treeIDs differed or simply an encountered node with the same treeID as the root if no node was encountered with a treeID different than the root node) is the target node. If the encountered node is not the target node, then the method returns to step 1002. If the encountered node is the target node, then the method proceeds to step 1014. At step 1014, the distributed metadata manager 110 modifies the target node as specified in the write operation. More specifically, the distributed metadata manager 110 modifies, adds, or deletes a node, depending on what the write operation is.

Figure 11:
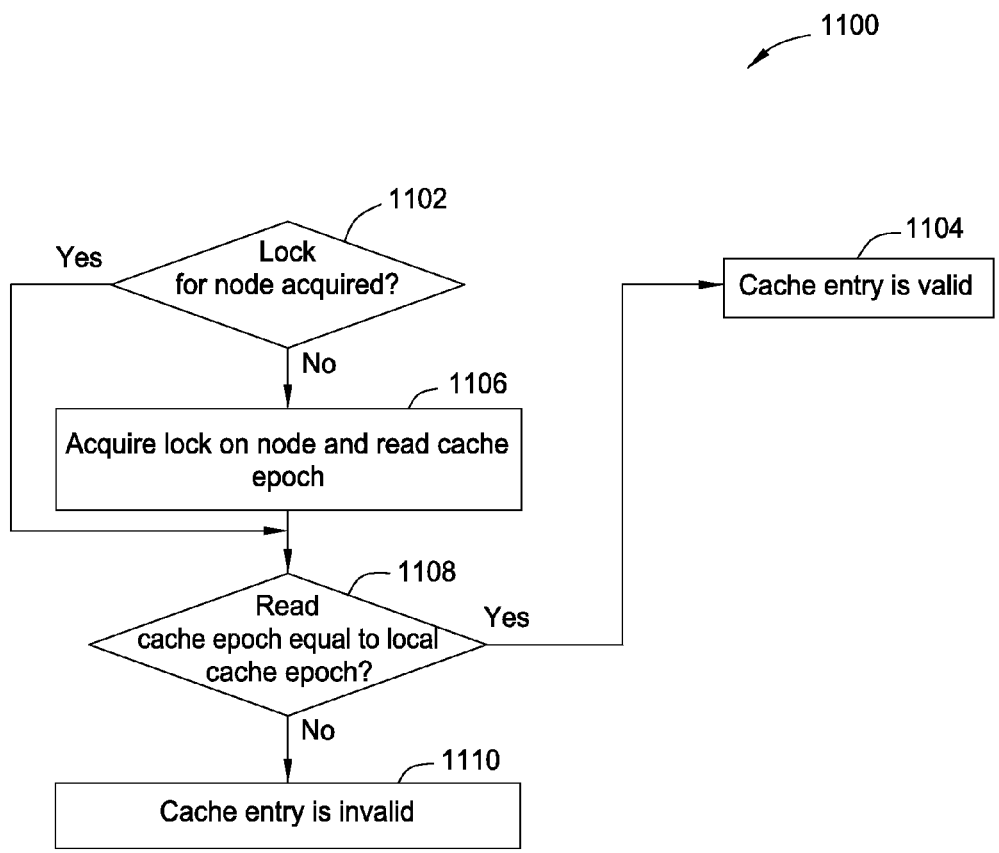
FIG. 11 is a flow diagram of method steps for determining whether a cache entry of a node stored in a local cache is valid, according to one embodiment.

FIG. 11 is a flow diagram of method steps for determining whether a cache entry of a node stored in a local cache is valid, according to one embodiment of the present invention. Although the method steps are described in conjunction with FIGS. 1-7, persons skilled in the art will understand that any system configured to perform the method steps, in any order, falls within the scope of the present invention.

As shown, a method 1100 begins at step 1102, where the distributed metadata manager 110 determines whether the distributed metadata manager 110 has a lock acquired for the node. If the distributed metadata manager 110 has a lock for the node, then the method proceeds to step 1108. If, in step 1102, the distributed metadata manager 110 does not have a lock for the node, then the method proceeds to step 1106. At step 1106, the distributed metadata manager 110 acquires a read-lock on the node and reads the cache epoch for that node from the distributed lock authority 108. At step 1108, if the cache epoch stored in the distributed lock authority 108 is equal to the cache epoch stored in the local cache, then the method proceeds to step 1104 and determines that the cache entry is valid. If, at step 1108, the cache epoch is not equal to the cache epoch stored in the local cache, then the method proceeds to step 108, at which the distributed metadata manager 110 determines that the cache entry is invalid.

One advantage of the disclosed approach is that clones of the file system metadata can be made very quickly and frequently. Another advantage is that modification operations are relatively quick as well. A further advantage is that the file system metadata is stored in a distributed manner, which allows the metadata to be stored in a robust manner.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Embodiments of the invention are described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for creating a backup copy of a set of file system metadata, the method comprising:
identifying a first set of pointers included in a first root node in a file system metadata tree structure that stores file system metadata in leaf nodes of the tree structure;
creating a first copy of the first root node that includes the first set of pointers;
creating a second copy of the first root node that includes the first set of pointers;
associating the first copy with a first view, wherein the first view represents a current state of the file system metadata;
associating the second copy with a second view, wherein the second view represents a snapshot in time of the file system metadata; and
modifying metadata in one or more leaf nodes of the tree structure, wherein the modifying comprises:
establishing a read lock on the first root node and one or more second nodes on a path between the first root node and the one or more leaf nodes,
upon determining that establishing a read lock on a third node exceeds a threshold number of read locks, releasing the read lock on a second node closest to the first root node and establishing a read lock on the third node,
generating one or more new leaf nodes by copying the one or more leaf nodes,
associating the one or more leaf nodes of the tree structure with the second view, and
associating the one or more new leaf nodes with the first view.

2. The method of claim 1, wherein identifying the first set of pointers comprises reading the first root node and acquiring a read-lock on the first root node prior to reading the first root node.

3. The method of claim 1, wherein identifying the first set of pointers comprises reading the first root node by performing a node-lookup operation with a node key.

4. The method of claim 1, further comprising deleting the first root node.

5. The method of claim 1, wherein:
the first root node includes a first tree identifier (treeID), the first copy has a second treeID, and the second copy has a third treeID; and
the first root node, the first copy, and the second copy each have a distinct treeID.

6. The method of claim 1, wherein each pointer in the first set of pointers includes an indication of which nodes are found by following that pointer.

7. The method of claim 1, wherein each leaf node of the tree structure stores a metadata key-value pair.

8. A system comprising:
a processor; and
a memory storing a metadata management application, which, when executed on the processor, performs an operation, comprising:
identifying a first set of pointers included in a first root node in a file system metadata tree structure that stores file system metadata in leaf nodes of the tree structure,
creating a first copy of the first root node that includes the first set of pointers, creating a second copy of the first root node that includes the first set of pointers, associating the first copy with a first view, wherein the first view represents a current state of the file system metadata, associating the second copy with a second view, wherein the second view represents a snapshot in time of the file system metadata, and modifying metadata in one or more leaf nodes of the tree structure, wherein the modifying comprises establishing a read lock on the first root node and one or more second nodes on a path between the first root node and the one or more leaf nodes, upon determining that establishing a read lock on a third node exceeds a threshold number of read locks, releasing the read lock on a second node closest to the first root node and establishing a read lock on the third node, generating one or more new leaf nodes by copying the one or more leaf nodes, generating one or more new leaf nodes, associating the one or more leaf nodes of the tree structure with the second view, and associating the one or more new leaf nodes with the first view.

9. The system of claim 8, wherein identifying the first set of pointers comprises reading the first root node and acquiring a read-lock on the first root node prior to reading the first root node.

10. The system of claim 8, wherein identifying the first set of pointers comprises reading the first root node by performing a node-lookup operation with a node key.

11. The system of claim 8, wherein the operation further comprises deleting the first root node.

12. The system of claim 8, wherein:
the first root node includes a first tree identifier (treeID), the first copy has a second treeID, and the second copy has a third treeID; and
the first root node, the first copy, and the second copy each have a distinct treeID.

13. The system of claim 8, wherein each pointer in the first set of pointers includes an indication of which nodes are found by following that pointer.

14. The system of claim 8, wherein each leaf node of the tree structure stores a metadata key-value pair.

15. A non-transitory computer-readable medium storing instructions that, when executed by a processor, cause the processor to perform the steps of:
identifying a first set of pointers included in a first root node in a file system metadata tree structure that stores file system metadata in leaf nodes of the tree structure;
creating a first copy of the first root node that includes the first set of pointers;
creating a second copy of the first root node that includes the first set of pointers;
associating the first copy with a first view, wherein the first view represents a current state of the file system metadata;
associating the second copy with a second view, wherein the second view represents a snapshot in time of the file system metadata; and
modifying metadata in one or more leaf nodes of the tree structure, wherein the modifying comprises establishing a read lock on the first root node and one or more second nodes on a path between the first root node and the one or more leaf nodes, upon determining that establishing a read lock on a third node exceeds a threshold number of read locks, releasing the read lock on a second node closest to the first root node and establishing a read lock on the third node, generating one or more new leaf nodes by copying the one or more leaf nodes, generating one or more new leaf nodes, associating the one or more leaf nodes of the tree structure with the second view, and associating the one or more new leaf nodes with the first view.

16. The non-transitory computer-readable medium of claim 15, wherein each leaf node of the tree structure stores a metadata key-value pair.

* * * * *

UNITED STATES PATENT AND TRADEMARK OFFICE
CERTIFICATE OF CORRECTION

PATENT NO. : 9,720,947 B2
APPLICATION NO. : 14/450730
DATED : August 1, 2017
INVENTOR(S) : Mohit Aron et al.

It is certified that error appears in the above-identified patent and that said Letters Patent is hereby corrected as shown below:

In the Specification

In Column 4, Line 61, delete "Rood" and insert --Root1--, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*